(12) United States Patent
Chen et al.

(10) Patent No.: US 11,734,383 B2
(45) Date of Patent: *Aug. 22, 2023

(54) VECTOR AND MATRIX COMPUTING DEVICE

(71) Applicant: Cambricon Technologies Corporation Limited, Beijing (CN)

(72) Inventors: Tianshi Chen, Beijing (CN); Xiao Zhang, Beijing (CN); Shaoli Liu, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 470 days.

This patent is subject to a terminal disclaimer.

(21) Appl. No.: 16/942,482

(22) Filed: Jul. 29, 2020

(65) Prior Publication Data

US 2020/0356621 A1 Nov. 12, 2020

Related U.S. Application Data

(63) Continuation of application No. 16/039,803, filed on Jul. 19, 2018, now Pat. No. 10,762,164, which is a
(Continued)

(30) Foreign Application Priority Data

Jan. 20, 2016 (CN) ......................... 201610037535.5
Jan. 20, 2016 (CN) ......................... 201610039216.8

(51) Int. Cl.
*G06F 17/16* (2006.01)
*G06F 7/487* (2006.01)
(Continued)

(52) U.S. Cl.
CPC ............ *G06F 17/16* (2013.01); *G06F 7/4873* (2013.01); *G06F 7/4876* (2013.01); *G06F 9/30036* (2013.01); *G06N 20/00* (2019.01)

(58) Field of Classification Search
CPC ...... G06F 17/16; G06F 7/4873; G06F 7/4876; G06F 9/30036; G06N 20/00
(Continued)

(56) References Cited

U.S. PATENT DOCUMENTS 4,541,046 A 9/1985 Nagashima et al.
4,888,679 A 12/1989 Fossum et al.
(Continued)

FOREIGN PATENT DOCUMENTS

CN 1349159 A 5/2002
CN 101620524 A 1/2010
(Continued)

OTHER PUBLICATIONS

Machine Translation of CN 103699360(A) (Year: 2014).*
(Continued)

*Primary Examiner* — Tan V Mai
(74) *Attorney, Agent, or Firm* — Getech Law LLC; Jun Ye

(57) ABSTRACT

A computing device and related products are provided. The computing device is configured to perform machine learning calculations. The computing device includes an operation unit, a controller unit, and a storage unit. The storage unit includes a data input/output (I/O) unit, a register, and a cache. Technical solution provided by the present disclosure has advantages of fast calculation speed and energy saving.

101 Claims, 4 Drawing Sheets

Related U.S. Application Data continuation-in-part of application No. PCT/CN2016/078550, filed on Apr. 6, 2016, and a continuation-in-part of application No. PCT/CN2016/078546, filed on Apr. 6, 2016.

(51) Int. Cl.
  *G06F 9/30* (2018.01)
  *G06N 20/00* (2019.01)

(58) Field of Classification Search
  USPC .......................................................... 708/520
  See application file for complete search history.

(56) References Cited

U.S. PATENT DOCUMENTS

| | | | |
|---|---|---|---|
| 5,689,653 | A | 11/1997 | Karp et al. |
| 6,282,634 | B1 | 8/2001 | Hinds et al. |
| 8,108,652 | B1 | 1/2012 | Hui |
| 10,762,164 | B2 * | 9/2020 | Chen ............... G06F 7/4873 |
| 2004/0103262 | A1 | 5/2004 | Glossner et al. |
| 2011/0138155 | A1 | 6/2011 | Kawaguchi |
| 2013/0212353 | A1 | 8/2013 | Mimar |
| 2014/0244967 | A1 | 8/2014 | Ingle et al. |
| 2015/0248290 | A1 | 9/2015 | Gschwind et al. |
| 2015/0356054 | A1 | 12/2015 | Barak et al. |

FOREIGN PATENT DOCUMENTS

| | | |
|---|---|---|
| CN | 102043723 A | 5/2011 |
| CN | 102163140 A | 8/2011 |
| CN | 102200964 A | 9/2011 |
| CN | 102360344 A | 2/2012 |
| CN | 102495721 A | 6/2012 |
| CN | 102521535 A | 6/2012 |
| CN | 102750127 A | 10/2012 |
| CN | 103678257 A | 3/2014 |
| CN | 104699458 A | 6/2015 |
| CN | 105009075 A | 10/2015 |
| JP | H04365170 A | 12/1992 |
| JP | H09325888 A | 12/1997 |
| JP | 3317985 B2 | 8/2002 |
| JP | 2009181293 A | 8/2009 |
| KR | 20010006787 A | 1/2001 |
| KR | 100289746 B1 | 5/2001 |
| KR | 20150005062 A | 1/2015 |
| KR | 20150037951 A | 4/2015 |
| WO | 2012037472 A2 | 3/2012 |
| WO | 2013054468 A1 | 4/2013 |

OTHER PUBLICATIONS

"Technical Study of Heterogeneous Multi-Core Network Security Processors Hardware Optimization", Schemer, Chinese Excellent PhD Thesis Library, Jul. 30, 2012, pp. 11.(with brief English explanation).

"Write the fifth stage of the CPU by yourself (1)—issues related to pipeline data", Available on internet URL: https://blog.csdn.net/leishangwen/article/details/38298787, Jul. 30, 2014, pp. 1-4.

Aaron Severance et al., "Venice: A Compact Vector Processor for FPGA Applications", Field-Programmable Technology (FPT), 2012 International Conference on, IEEE, Dec. 10, 2012, pp. 261-268.

CN201610037535—First Office Action, dated Sep. 25, 2019, 29 pages.

CN201610037535—Fourth Office Action, dated Dec. 28, 2020, 29 pages.

CN201610039216—First Office Action, dated Sep. 6, 2018, 20 pages.

CN201710907069—First Office Action, dated Sep. 18, 2019, 14 pages.

CN201710907069—Second Office Action, dated Dec. 9, 2019, 14 pages.

CN202010147559.2—First Office Action dated Feb. 28, 2023, 9 pages. (With Brief English Explanation).

CN202010318173.3—First Office Action dated Mar. 1, 2023, 14 pages. (With Brief English Explanation).

EP16885911.4—Communication pursuant to Article 94(3) EPC dated Mar. 4, 2020, 9 pages.

EP16885911.4—Summons to attend oral proceedings dated Jul. 22, 2020, 10 pages.

EP16885911.4—Supplementary European Search Report dated Jul. 25, 2019, 9 pages.

EP16885912.2—Supplementary European Search Report dated Apr. 1, 2020, 4 pages.

Format of 4.2 Instructions, uncut editor, "Computer composition principles", bongsand: Defense Technical University Press, Aug. 31, 2011, pp. 7 (with brief english explanation).

KR20187015436—Written Decision on Registration dated Apr. 27, 2020, 4 pages.

KR20207013258—Written Decision on Registration dated Jun. 15, 2021, 20 pages.

PCTCN2016078546—International Search Report and Written Opinion dated Oct. 31, 2016, 15 pages.

PCTCN2016078550—International Search Report and Written Opinion dated Aug. 22, 2016, 15 pages.

Severance Aaron et al: "Embedded supercomputing in FPGAs with the VectorBlox MXP Matrix Processor", 2013 International Conference on Hardware/Software Codesign and System Synthesis (CODES+ISSS), IEEE, Sep. 29, 2013 (Sep. 29, 2013), pp. 1-10, XP032524776.

VEGAS: Soft Vector Processor with Scratchpad Memory, christopher H. Chou et al, fPGA '11 Proceedings of the 19th ACM/SIGDA International symmetric on Field programmable gate arrays, mailed on Feb. 27, 2011, pp. 1-10.

Zhiduo Liu et al: "Accelerator compiler for the VENICE vector processor", Proceedings of the ACM/SIGDA international symposium on field programmable gate arrays, FPGA '12 , Feb. 22, 2012, 4 pages.

CN202010317170.8—First Office Action dated Mar. 11, 2023, 11 pages. (With Brief English Explanation).

CN202010318896.3—First Office Action dated Mar. 13, 2023, 14 pages. (With Brief English Explanation).

* cited by examiner

VECTOR AND MATRIX COMPUTING DEVICE

CROSS REFERENCE OF RELATED APPLICATION

This application is a continuation of U.S. patent application Ser. No. 16/039,803, filed on Jul. 19, 2019, which claims priority to U.S. National Phase Application No. PCT/CN2016/078550 filed on Apr. 6, 2016, and to U.S. National Phase Application No. PCT/CN2016/078546 filed on Apr. 6, 2016, which claims priority to Chinese Patent Application No. 201610037535.5, filed on Jan. 20, 2016, and to Chinese Patent Application No. 201610039216.8, filed on Jan. 20, 2016, the contents of the above-referenced applications are hereby expressly incorporated herein by reference in their entirety.

TECHNICAL FIELD

This disclosure relates to the field of information processing technology, and more particularly to a computing device and related products.

BACKGROUND

With the development of information technology and the ever-growing demand of people, people are increasingly demanding timeliness of information. Currently, a terminal acquires and processes information based on general-purpose processors.

In practice, a manner in which a general-purpose processor runs a software program to process information is limited by an operating speed of the general-purpose processor. Especially, in the case of the general-purpose processor with large load, efficiency of information processing is low, and delay is large as well. For a computational model of information processing such as a matrix operation neural network model, computational effort is larger, and therefore the general-purpose processor takes a long time to complete a matrix operation, which is inefficient.

SUMMARY

Embodiments of the present disclosure provide a computing device and related products, which can improve processing speed and efficiency of a matrix operation.

According to a first aspect of the present disclosure, a computing device is provided. The computing device is configured to perform machine learning calculations, and includes an operation unit, a controller unit, and a storage unit. The storage unit includes a data input/output (I/O) unit, and one or any combination of a register and a cache, where the data I/O unit is configured to acquire data, a machine learning model, and calculation instructions, and the storage unit is configured to store the machine learning model, input data, and weight data.

The controller unit is configured to extract a first calculation instruction from the storage unit, to obtain an operation code and an operation field of the first calculation instruction by parsing the first calculation instruction, to extract input data and weight data corresponding to the operation field, and to send the operation code as well as the input data and the weight data corresponding to the operation field to the operation unit, where the operation code is an operation code of a matrix calculation instruction.

The operation unit is configured to obtain a result of the first calculation instruction by performing an operation corresponding to the operation code on the input data and the weight data corresponding to the operation field, according to the operation code.

According to a second aspect of the present disclosure, a machine learning operation device is provided. The machine learning operation device includes at least one computing device of the first aspect. The machine learning operation device is configured to acquire data to be operated and control information from other processing devices, to perform a specified machine learning operation, and to send a result of performing the specified machine learning operation to other processing devices through an input/output (I/O) interface.

At least two computing devices are configured to connect with each other and to transmit data through a specific structure when the machine learning operation device includes the at least two computing devices.

The at least two computing devices are configured to interconnect with each other and to transmit data via a fast peripheral component interconnect express (PCIE) bus to support larger-scale machine learning operations. The at least two computing devices share a same control system or have their own control systems, share a memory or have their own memories, and have an interconnection mode of an arbitrary interconnection topology.

According to a third aspect of the present disclosure, a combined processing device is provided. The combined processing device includes the machine learning operation device of the second aspect, a universal interconnect interface, and other processing devices. The machine learning operation device is configured to interact with other processing devices to complete a user-specified operation. The combined processing device further includes a storage device. The storage device is connected with the machine learning operation device and other processing devices, and configured to store data of the machine learning operation device and other processing devices.

According to a fourth aspect of the present disclosure, a chip is provided. The chip includes any one of the machine learning operation device of the first aspect, the combined processing device of the second aspect, and the combined processing device of the third aspect.

According to a fifth aspect of the present disclosure, a chip packaging structure is provided. The chip packaging structure includes the chip of the fourth aspect.

According to a sixth aspect of the present disclosure, a board is provided. The board includes the chip packaging structure of the fifth aspect.

According to a seventh aspect of the present disclosure, an electronic equipment is provided. The electronic equipment includes the chip of the fourth aspect or the board of the sixth aspect.

In some implementations, the electronic equipment can be a data processing device, a robot, a computer, a printer, a scanner, a tablet, a smart terminal, a mobile phone, a driving recorder, a navigator, a sensor, a webcam, a server, a cloud server, a camera, a video camera, a projector, a watch, headphones, mobile storage, a wearable device, a vehicle, a home appliance, and/or a medical equipment.

In some implementations, the vehicle includes, but is not limited to, an airplane, a ship, and/or a car. The home appliance includes, but is not limited to, a television (TV), an air conditioner, a microwave oven, a refrigerator, an electric cooker, a humidifier, a washing machine, an electric lamp, a gas stove, and a hood. The medical equipment includes, but is not limited to, a nuclear magnetic resonance spectrometer, a B-ultrasonic, and/or an electrocardiograph.

According to the computing device provided by embodiments of the present disclosure, the operation code and the operation field are obtained by parsing the calculation instruction, the input data and the weight data corresponding to the operation field are extracted, and then the operation code as well as the input data and the weight data corresponding to the operation field are sent to the operation unit to perform an operation to obtain a calculation result, which can improve calculation efficiency.

BRIEF DESCRIPTION OF THE DRAWINGS

To illustrate technical solutions embodied by the embodiments of the present disclosure more clearly, the following briefly introduces the accompanying drawings required for describing the embodiments. Apparently, the accompanying drawings in the following description merely illustrate some embodiments of the present disclosure. Those of ordinary skill in the art may also obtain other drawings based on these accompanying drawings without creative efforts.

DETAILED DESCRIPTION

Hereinafter, technical solutions embodied by the embodiments of the disclosure will be described in a clear and comprehensive manner in reference to the accompanying drawings intended for the embodiments. It is evident that the embodiments described herein constitute merely some rather than all of the embodiments of the disclosure, and that those of ordinary skill in the art will be able to derive other embodiments based on these embodiments without creative efforts, which all such derived embodiments shall all fall in the protection scope of the disclosure.

The terms "first", "second", "third", and "fourth" used in the specification, the claims, and the accompany drawings of the present disclosure are used for distinguishing different objects rather than describing a particular order. The terms "include", "comprise", and "have" as well as variations thereof are intended to cover non-exclusive inclusion. For example, a process, method, system, product, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in connection with the embodiment may be contained in at least one embodiment of the present disclosure. The phrase appearing in various places in the specification does not necessarily refer to the same embodiment, nor does it refer an independent or alternative embodiment that is mutually exclusive with other embodiments. It is expressly and implicitly understood by those skilled in the art that an embodiment described herein may be combined with other embodiments.

Figure 1A:
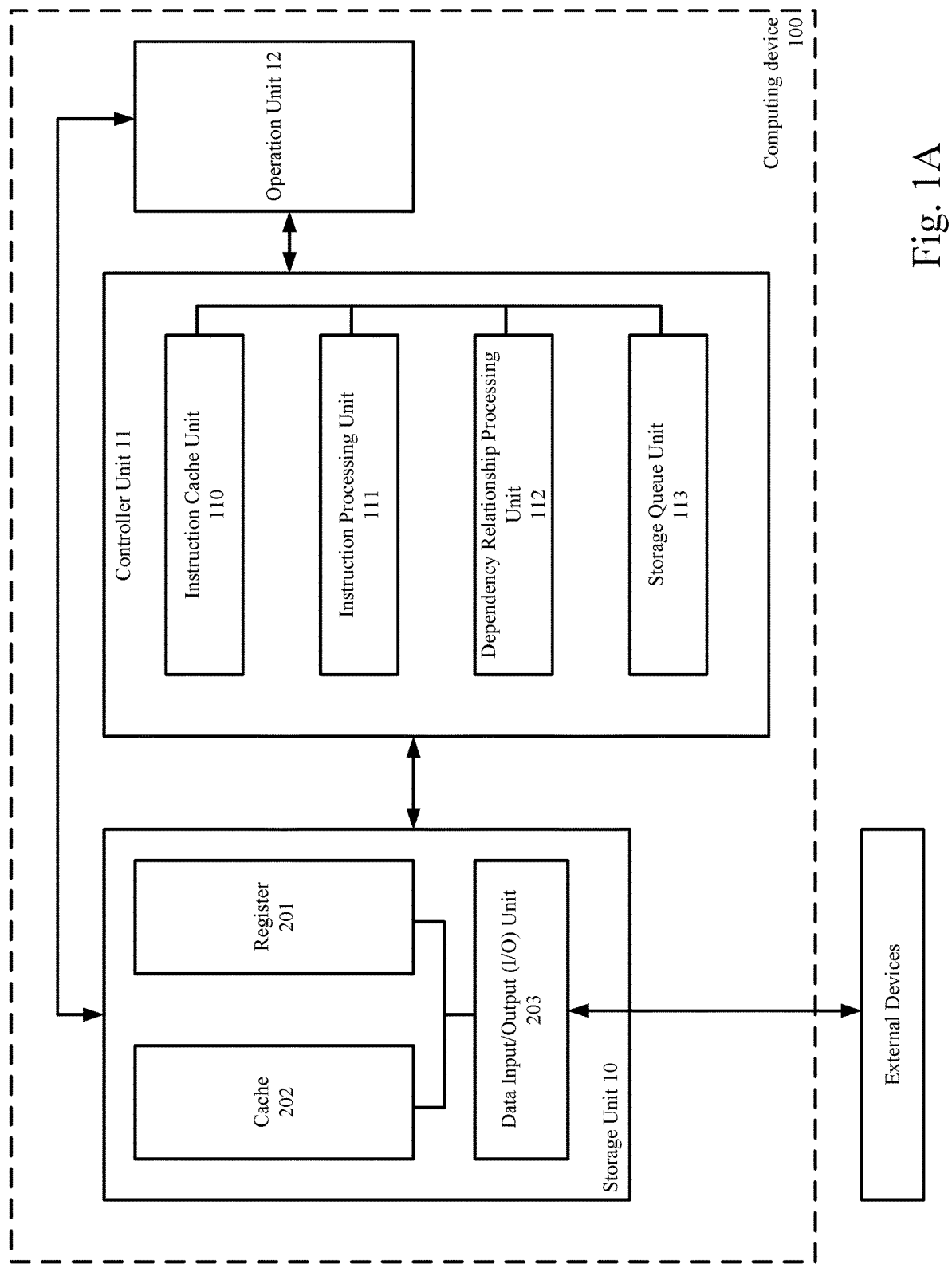
FIG. 1A is a schematic structural diagram illustrating a computing device according to an embodiment of the present disclosure.

As illustrated in FIG. 1A, a computing device is provided. The computing device may include a storage unit 10, a controller unit 11, and an operation unit 12. The controller unit 11 may be coupled with the storage unit 10 and the operation unit 12 respectively.

The storage unit 10 may include a data input/output (I/O) unit 203. The data I/O unit 203 may be configured to acquire data, a machine learning model, and calculation instructions. For example, when the machine learning model is an artificial neural network model, the acquired data may include, but is not limited to input data, weight data, and output data.

The controller unit 11 may be configured to extract a first calculation instruction from the storage unit 10, to obtain an operation code and an operation field of the first calculation instruction by parsing the first calculation instruction, to extract input data and weight data corresponding to the operation field, and to send the operation code as well as the input data and the weight data corresponding to the operation field to the operation unit 12. In an example, the operation code may be an operation code of a matrix calculation instruction.

The operation unit 12 may be configured to obtain a result of the first calculation instruction by performing an operation corresponding to the operation code on the input data and the weight data corresponding to the operation field, according to the operation code.

As one example, the controller unit 11 includes an instruction cache unit 110, an instruction processing unit 111, and a storage queue unit 113.

The instruction cache unit 110 may be configured to cache the first calculation instruction.

The instruction processing unit 111 may be configured to obtain the operation code and the operation field of the first calculation instruction by parsing the first calculation instruction.

The storage queue unit 113 may be configured to store an instruction queue, where the instruction queue may include a plurality of calculation instructions or operation codes to be executed arranged in a sequence of the instruction queue.

Taking the calculation instruction as an example, a structure of the calculation instruction can be illustrated as follows.

| operation code | register or immediate data | register or immediate data | ... |
|---|---|---|---|

In the above table, an ellipsis indicates that multiple registers or immediate data can be included.

In a nonlimiting example, the calculation instruction can be a COMPUTE instruction, but the structure of the calculation instruction may include but not be limited to a structure of the COMPUTE instruction. In one implementation, the calculation instruction may contain one or more operation fields and one operation code. The calculation instruction can also be a neural network operation instruction. Taking the neural network operation instruction as an example, register number 0, register number 1, register number 2, register number 3, and register number 4 illustrated in Table 1 can be used as operation fields. Each the register number 0, the register number 1, the register number 2, the register number 3, and the register number 4 may be number of one or more registers.

TABLE 1

| operation code | register number 0 | register number 1 | register number 2 | register number 3 | register number 4 |
|---|---|---|---|---|---|
| COMPUTE | start address of input data | length of input data | start address of weight | length of weight | address of interpolation table of activation function |
| IO | external memory address of data | length of data | internal memory address of data | | |
| NOP | | | | | |
| JUMP | target address | | | | |
| MOVE | input address | size of data | output address | | |

Figure 1B:
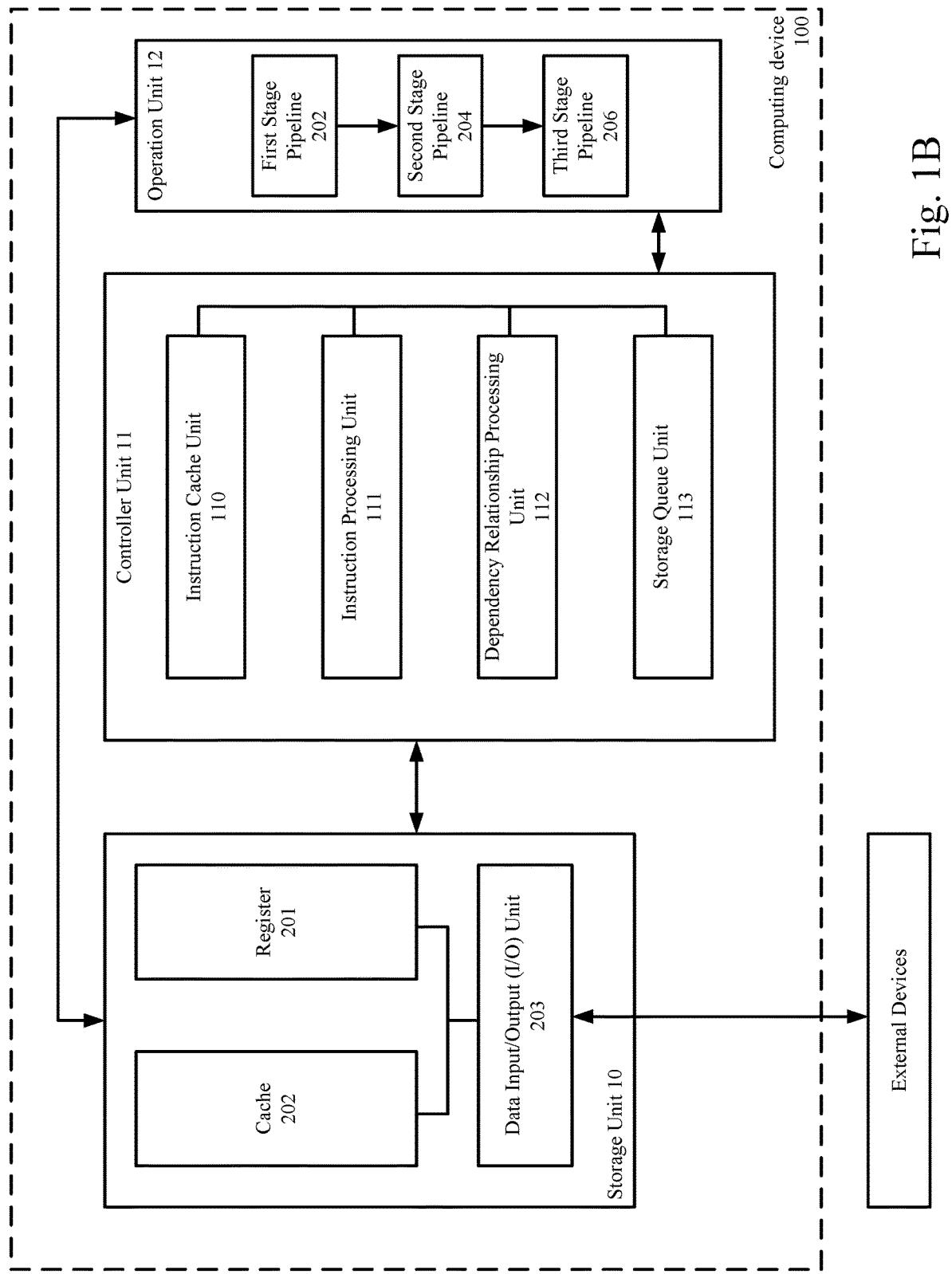
FIG. 1B is a structural diagram illustrating a computing device according to another embodiment of the present disclosure.

As one implementation, the storage unit 10 may further include one or any combination of a register 201 and a cache 202. For example, as illustrated in FIG. 1A or FIG. 1B, the storage unit 10 includes the register 201 and the cache 202. In an implementation, the register 201 can be a scalar register, and the cache 202 can be a scratch cache.

In another implementation, the register 201 can be an off-chip memory. In practice, the register 201 can also be an on-chip memory configured to store a data block. The data block can be n-dimensional data, where n is an integer greater than or equal to 1. For instance, when n=1, the data block is 1-dimensional data (i.e., a vector); when n=2, the data block is 2-dimensional data (i.e., a matrix); when n≥3, the data block is a multidimensional tensor. The storage unit 10 can include one or any combination of a register and a cache. The cache can be the storage unit 10, e.g., a scratch-pad memory included in the storage unit 10. Taking matrix data as an example of 2-dimensional data for illustration, a storage form of the 2-dimensional data of a memory may include, but is not limited to, a form in which rows of the matrix data may be stored in a storage unit after columns of the matrix data are stored in the storage unit. In practice, the storage form of the 2-dimensional data of the memory can also be a form in which columns of the matrix data may be stored in the storage unit after rows of the matrix data are stored in the storage unit.

As one implementation, the controller unit 11 further may include a dependency relationship processing unit 112.

The dependency relationship processing unit 112 may be configured to: determine whether there is an associated relationship between the first calculation instruction and a zeroth calculation instruction prior to the first calculation instruction, when multiple calculation instructions are to be executed; cache the first calculation instruction to the instruction cache unit 110 based on a determination that there is the associated relationship between the first calculation instruction and the zeroth calculation instruction; transmit the first calculation instruction extracted from the instruction cache unit 110 to the operation unit 12 after execution of the zeroth calculation instruction is completed.

The dependency relationship processing unit 112 configured to determine whether there is the associated relationship between the first calculation instruction and the zeroth calculation instruction prior to the first calculation instruction may be configured to: extract a first storage address space of the operation field of the first calculation instruction, according to the first calculation instruction; extract a zeroth storage address space of an operation field of the zeroth calculation instruction, according to the zeroth calculation instruction; determine there is the associated relationship between the first calculation instruction and the zeroth calculation instruction when there is an overlapping area of the first storage address space and the zeroth storage address space, or determine there is no associated relationship between the first calculation instruction and the zeroth calculation instruction when there is no overlapping area of the first storage address space and the zeroth storage address space.

In an implementation, the operation unit 12 illustrated in FIG. 1B can include a plurality of operation modules. The plurality of operation modules are configured to form a structure of n-stage pipeline and to perform calculations of the n-stage pipeline.

As one implementation, the operation unit 12 is configured to: obtain a first result by performing a calculation of a first stage pipeline 202 on the input data and the weight data; obtain a second result by performing a calculation of a second stage pipeline 204 on the first result input in the second stage pipeline 204; obtain a third result by performing a calculation of a third stage pipeline 206 on the second result input in the third stage pipeline 206; in a manner described earlier, calculation is performed step by step; obtain a nth result by performing a calculation of a nth stage pipeline on a $(n-1)^{th}$ result input in the nth stage pipeline; input the nth result to the storage unit 10, where n is an integer greater than or equal to 2.

As an example, the operation unit 12 is configured to perform a neural network calculation.

In an implementation, the operation unit 12 includes, but is not limited to, one or more multipliers of a first stage pipeline 202, one or more adders of a second stage pipeline 204 (e.g., the adders of the second stage pipeline 204 can form an adder tree), an activation function unit of a third stage pipeline 206, and/or a vector processing unit of a fourth stage pipeline. As one implementation, the vector processing unit of the fourth stage pipeline can perform a vector operation and/or a pooling operation. The first stage pipeline 202 is configured to obtain an output (hereinafter, an out) through multiplying input data 1 (hereinafter, an in1) by input data 2 (hereinafter, an in2), where the in1 can be input data, the in2 can be weight data, that is, the process performed by the first stage pipeline 202 can be expressed as out=in1*in2. The second stage pipeline 204 is configured to obtain output data (hereinafter, also recorded as an out) by adding input data (hereinafter, also recorded as an in1) through an adder. For example, when the second stage pipeline 204 is the adder tree, output data is obtained by adding the in1 step by step through the adder tree, where the in1 is a vector having a length of N and N is greater than 1, that is, the process performed by the second stage pipeline 204 can be expressed as out=in1 [1]+in1 [2]+ . . . +in1 [N]; and/or output data is obtained by adding a result of accumulation of the in1 through the adder tree to input data (hereinafter, also recorded as an in2), that is, the process performed by the second stage pipeline 204 can be expressed as out=in1 [1]+in1 [2]+ . . . +in1 [N]+in2; or output data is obtained by adding the in1 to the in2, that is, the process performed by the second stage pipeline 204 can be expressed as out=in1+in2. The third stage pipeline 206 is configured to obtain active output data (hereinafter, also recorded as an out) by performing an activation function operation (hereinafter, an active) on input data (hereinafter, an in), that is, the process performed by the third stage pipeline 206 can be expressed as out=active(in), where the active can be a sigmoid, a tanh, a relu, a softmax, or the like.

In addition to an activation operation, the third stage pipeline 206 can perform other nonlinear functions, and obtain output data (hereinafter, also recorded as an out) by performing an operation (hereinafter, a f) on input data (hereinafter, also recorded as an in), that is, the process performed by the third stage pipeline 206 can be expressed as out=f(in). The vector processing unit of the fourth stage pipeline is configured to obtain output data (hereinafter, also recorded as an out) by performing a pooling operation (hereinafter, a pool) on input data (hereinafter, also recorded as an in), that is, the process performed by the fourth stage pipeline can be expressed as out=pool(in), where the pool represents a pooling operation, which includes, but is not limited to, a mean-pooling, a max-pooling, and a median pooling, and the in is data of a pooled core related to the out.

The operation unit 12 is configured to perform the following operation. In a first part of the operation, the operation unit 12 is configured to obtain multiplied data through multiplying the input data 1 by the input data 2; and/or in a second part of the operation, the operation unit 12 is configured to perform an addition operation (e.g., an operation of an adder tree, the input data 1 is added step by step through the adder tree), or to obtain output data by adding the input data 1 to the input data 2; and/or in a third part of the operation, the operation unit 12 is configured to perform an activation function (hereinafter, an active) operation, and to obtain output data by performing the activation function operation on input data; and/or in a fourth part of the operation, the operation unit 12 is configured to perform a pooling operation (hereinafter, a pool), that is, out=pool(in), where the pool represents a pooling operation, the pooling operation includes, but is not limited to, a mean-pooling, a max-pooling, and a median pooling. The input data (hereinafter, in) is data of a pooled core related to the output data (hereinafter, out). The operations of the above parts can be freely selected by combining multiple parts in different sequences to achieve various functional operations. Accordingly, computing units can form a structure of two-stage pipeline, a structure of three-stage pipeline, a structure of four-stage pipeline, or the like.

As one implementation, the calculation instruction mentioned above can be a vector instruction. The calculation instruction includes, but is not limited to, a vector addition instruction (VA), a vector-add-scalar instruction (VAS), a vector subtraction instruction (VS), a scalar-subtract-vector instruction (SSV), a vector-multiply-vector instruction (VMV), a vector-multiply-scalar instruction (VMS), a vector division instruction (VD), a scalar-divide-vector instruction (SDV), a vector AND vector instruction (VAV), a vector AND instruction (VAND), a vector OR vector instruction (VOV), a vector OR instruction (VOR), a vector exponent instruction (VE), a vector logarithm instruction (VL), a vector greater than instruction (VGT), a vector equal decision instruction (VEQ), a vector invert instruction (VINV), a vector merge instruction (VMER), a vector maximum instruction (VMAX), a scalar to vector instruction (STV), a scalar to vector Pos N instruction (STVPN), a vector Pos N to scalar instruction (VPNTS), a vector retrieval instruction (VR), a vector dot product instruction (VP), a random vector instruction (RV), a vector cyclic shift instruction (VCS), a vector load instruction (VLOAD), a vector storage instruction (VS), a vector movement instruction (VMOVE), a matrix-multiply-vector instruction (MMV), a vector-multiply-matrix instruction (VMM), a matrix-multiply-scalar instruction (VMS), a tensor operation instruction (TENS), a matrix addition instruction (MA), a matrix subtraction instruction (MS), a matrix retrieval instruction (MR), a matrix load instruction (ML), a matrix storage instruction (MS), and a matrix movement instruction (MMOVE).

For the vector addition instruction (VA), a device is configured to respectively retrieve two blocks of vector data of a specified size from specified addresses of the storage unit 10, e.g., a scratchpad memory included in the storage unit 10. Then an addition operation is performed on the two blocks of vector data in the operation unit 12, e.g., a vector operation unit included in the operation unit 12. Finally, a result of the addition operation may be written back into a specified address of the storage unit 10 or the scratchpad memory.

For the vector-add-scalar instruction (VAS), a device is configured to retrieve vector data of a specified size from a specified address of the storage unit 10, e.g., a scratchpad memory included in the storage unit 10 and scalar data from a specified address of a scalar register file. Then, in the storage unit 10, e.g., a scalar operation unit in the storage unit 10, a value of a scalar is added to each element of a vector. Finally, a result is written back into a specified address of the scratchpad memory.

For the vector subtraction instruction (VS), a device is configured to respectively retrieve two blocks of vector data of a specified size from specified addresses of the storage unit 10, e.g., a scratchpad memory included in the storage unit 10. Then a subtraction operation is performed on the two blocks of vector data in a vector operation unit. Finally, a result is written back into a specified address of the scratchpad memory.

For the scalar-subtract-vector instruction (SSV), a device is configured to retrieve scalar data from a specified address of a scalar register file and vector data from a specified address of the storage unit 10, e.g., a scratchpad memory included in the storage unit 10. Then, in a vector calculation unit, subtract corresponding elements of a vector with a scalar. Finally, a result is written back into a specified address of the scratchpad memory.

For the vector-multiply-vector instruction (VMV), a device is configured to respectively retrieve two blocks of vector data of a specified size from specified addresses of the storage unit 10, e.g., a scratchpad memory included in the storage unit 10. Then, in a vector calculation unit, a contrapuntal multiplication operation is performed on the two blocks of vector data. Finally, a result is written back into a specified address of the scratchpad memory.

For the vector-multiply-scalar instruction (VMS), a device is configured to retrieve vector data of a specified size from a specified address of the storage unit 10, e.g., a scratchpad memory included in the storage unit 10 and scalar data of a specified size from a specified address of a scalar register file. Then a vector-multiply-scalar operation is performed (that is, a vector is multiplied by a scalar) in the operation unit 12, e.g., a vector operation unit included in the operation unit 12. Finally, a result is written back into a specified address of the scratchpad memory.

For the vector division instruction (VD), a device is configured to respectively retrieve two blocks of vector data of a specified size from specified addresses of the storage unit 10, e.g., a scratchpad memory included in the storage unit 10. Then, in a vector operation unit, a contrapuntal division operation is performed on the two blocks of vector data. Finally, a result is written back into a specified address of the scratchpad memory.

For the scalar-divide-vector instruction (SDV), a device is configured to retrieve scalar data from a specified address of a scalar register file and vector data of a specified size from a specified address of the storage unit 10, e.g., a scratchpad memory included in the storage unit 10. Then, in a vector calculation unit, divide a scalar by corresponding elements of a vector. Finally, a result is written back into a specified address of the scratchpad memory.

For the vector AND vector instruction (VAV), a device is configured to respectively retrieve two blocks of vector data of a specified size from specified addresses of the storage unit 10, e.g., a scratchpad memory included in the storage unit 10. Then, in a vector operation unit, a contrapuntal AND operation is performed on two vectors. Finally, a result is written back into a specified address of the scratchpad memory.

For the vector AND instruction (VAND), a device is configured to retrieve vector data of a specified size from a specified address of the storage unit 10, e.g., a scratchpad memory included in the storage unit 10. Then, in a vector operation unit, an AND operation is performed on each element of a vector. Finally, a result is written back into a specified address of a scalar register file.

For the vector OR vector instruction (VOV), a device is configured to respectively retrieve two blocks of vector data of a specified size from specified addresses of the storage unit 10, e.g., a scratchpad memory included in the storage unit 10. Then, in a vector operation unit, a contrapuntal OR operation is performed on two vectors. Finally, a result is written back into a specified address of the scratchpad memory.

For the vector OR instruction (VOR), a device is configured to retrieve vector data of a specified size from a specified address of the storage unit 10, e.g., a scratchpad memory included in the storage unit 10. Then, a OR operation on each element of a vector is performed in a vector operation unit. Finally, a result is written back into a specified address of a scalar register file.

For the vector exponent instruction (VE), a device is configured to retrieve vector data of a specified size from a specified address of the storage unit 10, e.g., a scratchpad memory included in the storage unit 10. Then, an exponent operation on each element of a vector is performed in the vector operation unit. Finally, a result is written back into a specified address of the scratchpad memory.

For the vector logarithm instruction (VL), a device is configured to retrieve vector data of a specified size from a specified address of the storage unit 10, e.g., a scratchpad memory included in the storage unit 10. Then, a logarithm operation on each element of a vector is performed in a vector operation unit. Finally, a result is written back into a specified address of the scratchpad memory.

For the vector greater than instruction (VGT), a device is configured to respectively retrieve two blocks of vector data of a specified size from specified addresses of the storage unit 10, e.g., a scratchpad memory included in the storage unit 10. Then, in a vector operation unit, the two blocks of vector data are contrapuntally compared; a corresponding element of an output vector is set as "1" if an element of a former vector is greater than a corresponding element of a latter vector, otherwise, the corresponding element of the output vector is set as "0". Finally, a result is written back into a specified address of the scratchpad memory.

For the vector equal decision instruction (VEQ), a device is configured to respectively retrieve two blocks of vector data of a specified size from specified addresses of the storage unit 10, e.g., a scratchpad memory included in the storage unit 10. Then, in a vector operation unit, the two blocks of vector data are contrapuntally compared; a corresponding element of an output vector is set as "1" if an element of a former vector is equal to a corresponding element of a latter vector, otherwise, the corresponding element of the output vector is set as "0". Finally, a result is written back into a specified address of the scratchpad memory.

For the vector invert instruction (VINV), a device is configured to retrieve vector data of a specified size from a specified address of the storage unit 10, e.g., a scratchpad memory included in the storage unit 10. Then, a NOT operation on each element of a vector is performed. Finally, a result is written back into a specified address of the scratchpad memory.

For the vector merge instruction (VMER), a device is configured to respectively retrieve vector data of a specified size from specified addresses of the storage unit 10, e.g., a scratchpad memory included in the storage unit 10, where the vector data includes a selecting vector, a selected vector I, and a selected vector II. Then the operation unit 12, e.g., a vector operation unit included in the operation unit 12 selects a corresponding element from the selected vector I or the selected vector II as an element of an output vector, according to a value ("1" or "0") of an element of the selecting vector. Finally, a result is written back into a specified address of the scratchpad memory.

For the vector maximum instruction (VMAX), a device is configured to retrieve vector data of a specified size from a specified address of the storage unit 10, e.g., a scratchpad memory included in the storage unit 10. Then a maximum element of a vector is selected as a result. Finally, the result is written back into a specified address of a scalar register file.

For the scalar to vector instruction (STV), a device is configured to retrieve scalar data from a specified address of a scalar register file. Then, in a vector operation unit, a scalar is extended to be a vector of a specified length. Finally, a result is written back into the scalar register file. For example, a scalar may be converted to a vector, each element of the vector being a value equal to the scalar.

For the scalar to vector Pos N instruction (STVPN), a device is configured to retrieve a scalar from a specified address of a scalar register file and a vector of a specified size from a specified address of the storage unit 10, e.g., a scratchpad memory included in the storage unit 10. Then, in a vector calculation unit, an element in a specified position of the vector is replaced with a value of the scalar. Finally, a result is written back into a specified address of the scratchpad memory.

For the vector Pos N to scalar instruction (VPNTS), a device is configured to retrieve a scalar from a specified address of a scalar register file and a vector of a specified size from a specified address of the storage unit 10, e.g., a scratchpad memory included in the storage unit 10. Then, in a vector calculation unit, a value of the scalar is replaced with an element in a specified position of the vector. Finally, a result is written back into a specified address of the scalar register file.

For the vector retrieval instruction (VR), a device is configured to retrieve a vector of a specified size from a specified address of the storage unit 10, e.g., a scratchpad memory included in the storage unit 10. Then, in a vector calculation unit, an element of the vector is extracted according to a specified position to serve as an output. Finally, a result is written back into a specified address of a scalar register file.

For the vector dot product instruction (VP), a device is configured to respectively retrieve two blocks of vector data of a specified size from specified addresses of the storage unit 10, e.g., a scratchpad memory included in the storage unit 10. Then, in a vector calculation unit, a dot product operation on two vectors is performed. Finally, a result is written back into a specified address of a scalar register file.

For the random vector instruction (RV), a device is configured to generate, in a vector calculation unit, a random vector satisfying uniform distribution ranging from 0 to 1. Finally, a result is written back into a specified address of the storage unit 10, e.g., a scratchpad memory included in the storage unit 10.

For the vector cyclic shift instruction (VCS), a device is configured to retrieve a vector of a specified size from a specified address of the storage unit 10, e.g., a scratchpad memory included in the storage unit 10. Then, in a vector calculation unit, a cyclic shift operation on the vector is performed according to a specified step size. Finally, a result is written back into a specified address of the scratchpad memory.

For the vector load instruction (VLOAD), a device is configured to load vector data of a specified size from a specified external source address to a specified address of the storage unit 10, e.g., a scratchpad memory included in the storage unit 10.

For the vector storage instruction (VS), a device is configured to store vector data of a specified size from a specified address of the storage unit 10, e.g., a scratchpad memory included in the storage unit 10 into an external destination address, e.g., an external storage device to the computing device 100.

For the vector movement instruction (VMOVE), a device is configured to store (in other words, move) vector data of a specified size from a specified address of the storage unit 10, e.g., a scratchpad memory included in the storage unit 10 into another specified address of the scratchpad memory.

For the matrix-multiply-vector instruction (MMV), a device is configured to fetch matrix data and vector data of a specified size from specified addresses of the storage unit 10, e.g., a scratchpad memory included in the storage unit 10. Then a matrix is multiplied by a vector in a matrix operation unit. Finally, a result is written back into a specified address of the scratchpad memory. It should be noted that, the vector can be stored as a matrix of a specific form (i.e., a matrix with only one row of elements) in the scratchpad memory.

For the vector-multiply-matrix instruction (VMM), a device is configured to fetch vector data and matrix data of a specified length from specified addresses of the storage unit 10, e.g., a scratchpad memory included in the storage unit 10. Then a vector is multiplied by a matrix in a matrix operation unit. Finally, a result is written back into a specified address of the scratchpad memory. It should be noted that, the vector can be stored as a matrix of a specific form (i.e., a matrix with only one row of elements) in the scratchpad memory.

For the matrix-multiply-scalar instruction (VMS), a device is configured to fetch matrix data of a specified size from a specified address of the storage unit 10, e.g., a scratchpad memory included in the storage unit 10 and scalar data of a specified size from a specified address of a scalar register file. Then a scalar is multiplied by a matrix in a matrix operation unit. Finally, a result is written back into a specified address of the scratchpad memory. It should be noted that, the scalar register file stores both the scalar data and an address of the matrix.

For the tensor operation instruction (TENS), a device is configured to respectively fetch two blocks of matrix data of a specified size from two specified addresses of the storage unit 10, e.g., a scratchpad memory included in the storage unit 10. Then a tensor operation on the two blocks of matrix data is performed in a matrix operation unit. Finally, a result is written back into a specified address of the scratchpad memory.

For the matrix addition instruction (MA), a device is configured to respectively fetch two blocks of matrix data of a specified size from two specified addresses of the storage unit 10, e.g., a scratchpad memory included in the storage unit 10. Then an addition operation on two matrices is performed in a matrix operation unit. Finally, a result is written back into a specified address of the scratchpad memory.

For the matrix subtraction instruction (MS), a device is configured to respectively fetch two blocks of matrix data of a specified size from two specified addresses of the storage unit 10, e.g., a scratchpad memory included in the storage unit 10. Then a subtraction operation on two matrices is performed in a matrix operation unit. Finally, a result is written back into a specified address of the scratchpad memory.

For the matrix retrieval instruction (MR), a device is configured to fetch vector data of a specified size from a specified address of the storage unit 10, e.g., a scratchpad memory included in the storage unit 10 and matrix data of a specified size from a specified address of the scratchpad memory, where, in a matrix operation unit, the vector is an index vector, and an ith element of an output vector is an element found in the ith column of the matrix by using an ith element of the index vector as an index. Finally, the output vector is written back into a specified address of the scratchpad memory.

For the matrix load instruction (ML), a device is configured to load data of a specified size from a specified external source address to a specified address of the storage unit 10, e.g., a scratchpad memory included in the storage unit 10.

For the matrix storage instruction (MS), a device is configured to store matrix data of a specified size from a specified address of the storage unit 10, e.g., a scratchpad memory included in the storage unit 10 into an external destination address.

For the matrix movement instruction (MMOVE), a device is configured to store (in other words, move) matrix data of a specified size from a specified address of the storage unit 10, e.g., a scratchpad memory included in the storage unit 10 into another specified address of the scratchpad memory.

The scratchpad memory mentioned above is merely an example, which is a representation of a storage unit. It should be understood that, the above instructions can also use other storage units. Storage unit of the above instructions is not limited in embodiments of the present disclosure.

As an example, the structure of n-stage pipeline mentioned above can be a structure of two-stage pipeline. The structure of two-stage pipeline is configured to execute the first calculation instruction, where the first calculation instruction can be a matrix and scalar calculation instruction. The matrix and scalar calculation instruction includes, but is not limited to, a vector-add-scalar instruction (VAS), a scalar-subtract-vector instruction (SSV), a vector-multiply-scalar instruction (VMS), a scalar-divide-vector instruction (SDV), a matrix-add-scalar instruction, a scalar-subtract-matrix instruction, a matrix-multiply-scalar instruction, a scalar-divide-matrix instruction, a vector addition instruction (VA), a matrix addition instruction (VA), a matrix-multiply-scalar instruction (VMS), a matrix addition instruction (MA), and a matrix subtraction instruction (MS). The foregoing instructions can be executed by adopting a structure illustrated in FIG. 1B, in this case, the third stage pipeline 206 can be deleted or perform a null operation (i.e., the third stage pipeline 206 has output data the same as input data).

When the first calculation instruction is the matrix and scalar calculation instruction, the controller unit 11 is configured to: extract the matrix and scalar calculation instruction from the storage unit 10, obtain a first operation code and a first operation field of the matrix and scalar calculation instruction by parsing the matrix and scalar calculation instruction, extract input data and weight data corresponding to the first operation field, and send the first operation code as well as the input data and the weight data corresponding to the first operation field to the operation unit 12.

The operation unit 12 includes a structure of two-stage pipeline, with this structure, an operation module in a structure of a first stage pipeline 202 of the operation unit 12 is configured to obtain an intermediate result by performing an arithmetic operation corresponding to the first operation code on the input data and the weight data; an operation module in a structure of a second stage pipeline 204 of the operation unit 12 is configured to obtain the result of the first calculation instruction by performing a subsequent operation on the intermediate result.

The subsequent operation can be a null operation, that is, the operation module in the structure of the second stage pipeline 204 obtains the result of the first calculation instruction by outputting the intermediate result. It should be noted that, the structure of the two-stage pipeline mentioned above can be replaced with a structure of three-stage pipeline. As one implementation, an operation module of a structure of a first stage pipeline 202 in the structure of three-stage pipeline has the same performing manner as that of an operation module of the structure of two-stage pipeline; likewise, an operation module of a structure of a second stage pipeline 204 in the structure of three-stage pipeline outputs an intermediate result to an operation module of a structure of a third stage pipeline 206 in the structure of three-stage pipeline, and the operation module of the structure of the third stage pipeline 206 outputs the intermediate result to obtain the result of the first calculation instruction.

As another example, the structure of n-stage pipeline, as mentioned above, can be a structure of three-stage pipeline. The structure of three-stage pipeline is configured to execute the first calculation instruction, and the first calculation instruction can be a multiplication instruction. The multiplication instruction includes, but is not limited to, a vector-multiply-vector instruction (VMV), a matrix-multiply-matrix multiplication instruction, a matrix-multiply-vector instruction (MMV), and a vector-multiply-matrix instruction (VMM).

When the first calculation instruction is the multiplication instruction, the controller unit 11 is configured to: extract the multiplication instruction from the storage unit 10, obtain a first operation code and a first operation field of the multiplication instruction by parsing the multiplication instruction, extract input data and weight data corresponding to the first operation field, and send the first operation code as well as the input data and the weight data corresponding to the first operation field to the operation unit 12.

The operation unit 12 includes a plurality of operation modules. An operation module in a structure of a first stage pipeline 202 of the operation unit 12 is configured to obtain a multiplication result by performing a multiplication operation on the input data and the weight data received. An operation module in a structure of a second stage pipeline 204 of the operation unit 12 is configured to obtain an intermediate result by performing an addition operation on the multiplication result sent to the operation module in the structure of the second stage pipeline 204, and to send the intermediate result to an operation module in a structure of a third stage pipeline 206. The operation module in the structure of the third stage pipeline 206 is configured to obtain a result of the multiplication instruction by stitching and combining the intermediate result. In an implementation, the result of the multiplication instruction obtained is a result matrix and the intermediate result is data in each column, a manner of the stitching and combining the intermediate result includes, but is not limited to, a manner where the result matrix is obtained by putting each intermediate result into a column of the result matrix.

As yet another example, the structure of n-stage pipeline mentioned above can be a structure of three-stage pipeline. The structure of three-stage pipeline is configured to execute the first calculation instruction, and the first calculation instruction can be a division instruction. The division instruction includes, but is not limited to, a vector division instruction (VD) and a matrix division instruction. The structure of n-stage pipeline is a structure of three-stage pipeline.

When the first calculation instruction is the division instruction, the controller unit 11 is configured to: extract the division instruction from the storage unit 10, obtain a first operation code and a first operation field of the division instruction by parsing the division instruction, extract input data and weight data corresponding to the first operation field, and send the first operation code as well as the input data and the weight data corresponding to the first operation field to the operation unit 12.

The operation unit 12 includes a plurality of operation modules, and the plurality of operation modules form a three-stage pipeline. An operation module in a structure of a first stage pipeline 202 is configured to obtain inverse weight data by performing an inversion on the weight data, and to send the input data and the inverse weight data to an operation module in a structure of a second stage pipeline 204. The operation module in the structure of the second stage pipeline 204 is configured to obtain an intermediate result by performing an inner product operation on the input data and the inverse weight data, and to send the intermediate result to an operation module in a structure of a third stage pipeline 206. The operation module in the structure of the third stage pipeline 206 is configured to obtain a result of the division instruction by stitching and combining the intermediate result.

The present disclosure further provides a machine learning computing method. The machine learning computing method can be applied to the above-mentioned computing device. For structure and technical solution of the above-mentioned computing device, reference may be made to the description of embodiments illustrated in FIG. 1A, and the disclosure will not be described in further detail herein. In the following, take a neural network operation instruction as an example for describing a computing method of the computing device illustrated in FIG. 1A. For a neural network operation instruction, a formula to be executed can be expressed as s=s(A*B+b). In other words, a bias b is added to a result of multiplying an input matrix A by a weight matrix B, to perform an activation operation s(h) to obtain a final output result s.

The method for executing the neural network operation instruction through the computing device illustrated in FIG. 1A may include the following actions.

The controller unit 11 extracts a neural network calculation instruction from the instruction cache unit 110, obtains a first operation code and a first operation field of the neural network calculation instruction by parsing the neural network calculation instruction, extracts, from the storage unit 10, an input matrix A and a weight matrix B corresponding to the first operation field, and sends the first operation code as well as the input matrix A and the weight matrix B corresponding to the first operation field to the operation unit 12.

The operation unit 12 can include a structure of three-stage pipeline. A first stage pipeline 202 includes multipliers, a second stage pipeline 204 includes a sorting operator, and a third stage pipeline 206 includes an adder and an activation operator. The operation unit 12 splits the input matrix A into a plurality of sub-matrices Ax (where x represents number of the plurality of sub-matrices), distributes the plurality of sub-matrices Ax to a plurality of multipliers of the first stage pipeline 202, and broadcasts the weight matrix B to the plurality of multipliers of the first stage pipeline 202.

Each multiplier performs a matrix-multiply-matrix operation on the sub-matrices Ax and the weight matrix B to obtain an intermediate result, and then all intermediate results obtained are sent to the sorting operator of the second stage pipeline 204. The sorting operator sorts all the intermediate results according to number of the sub-matrices Ax to obtain a sorted result, and sends the sorted result to the adder of the third stage pipeline 206. The adder performs an operation of the bias b on the sorted result to obtain a result added a bias. The activation operator performs an activation operation S(h) on the result added the bias to obtain an output result, and stores the output result to the storage unit 10.

Technical solution provided by the present disclosure can realize a matrix-multiply-matrix operation by adopting a structure of n-stage pipeline (for example, n is equal to 3, 2, or the like). During the entire operation process, data only needs to be extracted from the storage unit once and does not need to be extracted again under a structure of three-stage pipeline. In this case, the number of data extractions can be reduced and efficiency of data extraction can be improved. In addition, the structure of three-stage pipeline does not need to cache data when performing intermediate operations, which can greatly reduce intermediate cache, thus reducing the intermediate cache and cost. Meanwhile, most multiplication operations are assigned to multiple multipliers, it is possible to save computation time and reduce power consumption of computation.

The present disclosure further provides a machine learning operation device including at least one computing device mentioned in the present disclosure. The machine learning operation device is configured to acquire data to be operated and control information from other processing devices, to perform a specified machine learning operation, and to send a result of performing the specified machine learning operation to peripheral devices through an input/output (I/O) interface. For example, the peripheral device can be a camera, a display, a mouse, a keyboard, a network card, a wireless-fidelity (Wi-Fi) interface, a server, and so on. When at least two computing devices are included, the at least two computing devices are configured to connect with each other and to transmit data through a specific structure. In an implementation, the at least two computing devices are configured to interconnect with each other and to transmit data via a fast peripheral component interconnect express (PCIE) bus, to support larger-scale machine learning operations. At this point, the at least two computing devices share a same control system or have their own control systems, and share a memory or have their own memories. In addition, the at least two computing devices have an interconnection mode of an arbitrary interconnection topology.

The machine learning operation device has high compatibility and can be connected with various types of servers through the PCIE interface.

Figure 2:
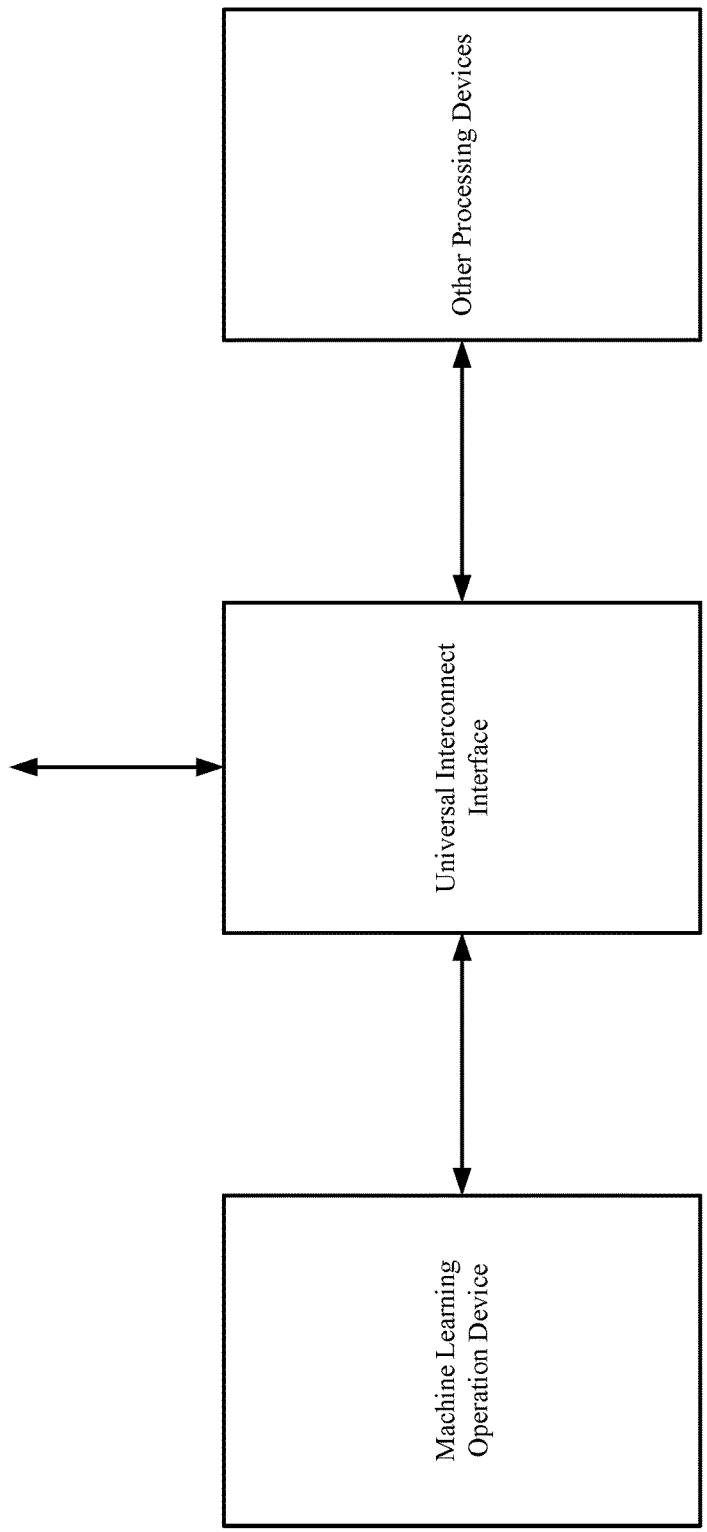
FIG. 2 is a structural diagram illustrating a combined processing device according to an embodiment of the present disclosure.

The present disclosure further provides a combined processing device. The combined processing device includes the machine learning operation device mentioned above, a universal interconnect interface, and other processing devices. The machine learning operation device is configured to interact with other processing devices to complete a user-specified computing operation. FIG. 2 is a schematic diagram of a combined processing device.

Other processing devices can include one or more of general-purpose processors and special-purpose processors, such as a central processing unit (CPU), a graphics processing unit (GPU), a machine learning processing unit, and other types of processors. It should be noted that, the number of processors included in other processing devices is not limited herein. Other processing devices serve as interfaces of the machine learning computing device for controlling external data, for example, data transfer, and complete basic control such as opening and stopping of the machine learning computing device. Other processing devices can also cooperate with the machine learning computing device to complete a computing task.

The universal interconnect interface is configured to transmit data and control commands between the machine learning operation device and other processing devices. The machine learning operation device is configured to acquire required input data from other processing devices, and to write the input data acquired to a storage device of a slice of the machine learning operation device. The machine learning operation device can be configured to acquire the control commands from other processing devices and to write the control commands acquired to a control cache of the slice of the machine learning operation device. Data of a storage module of the machine learning operation device can be read and transmitted to other processing devices.

Figure 3:
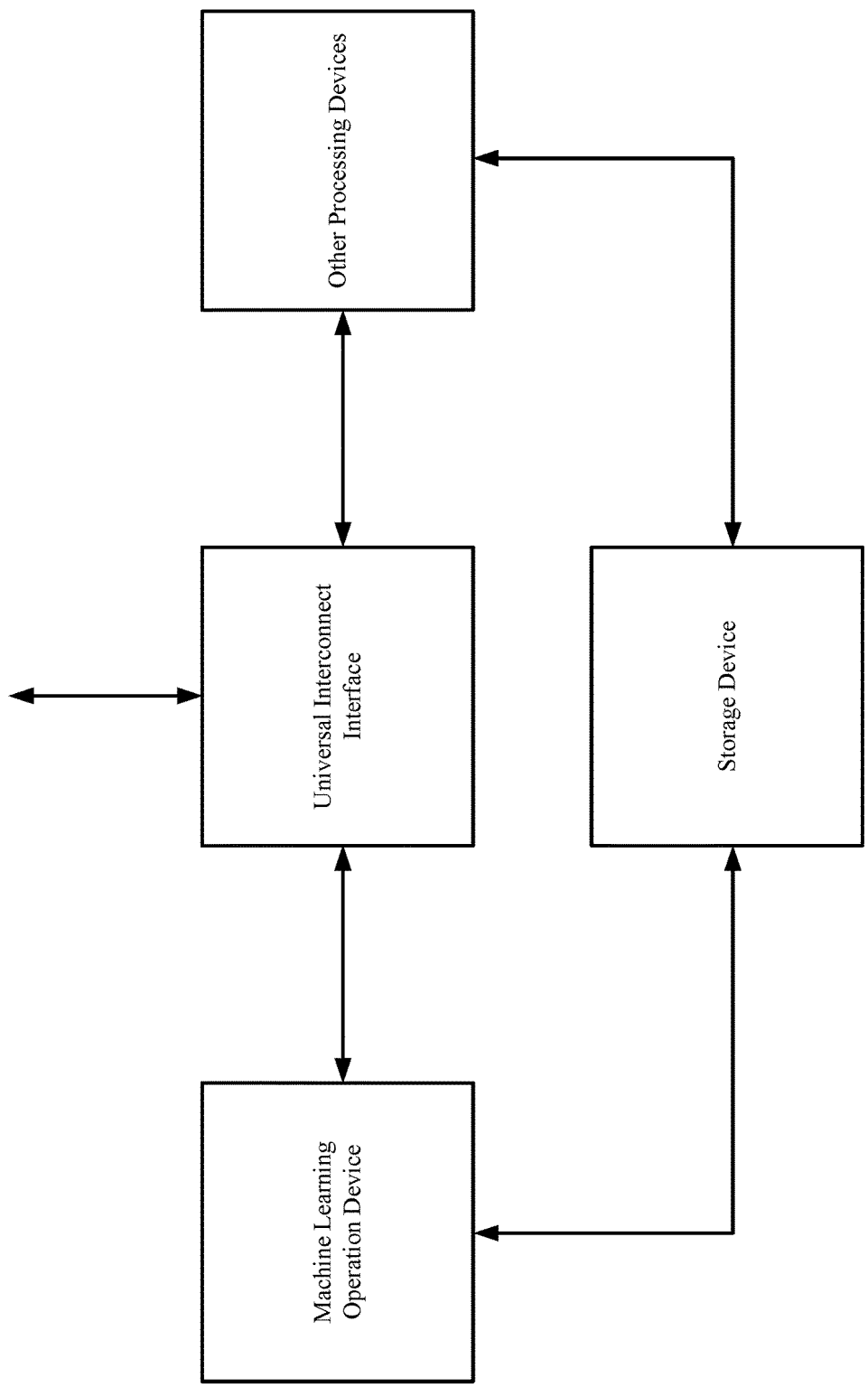
FIG. 3 is a structural diagram illustrating another combined processing device according to an embodiment of the present disclosure.

As one implementation, as illustrated in FIG. 3, the combined processing device further includes a storage device. The storage device is connected with the machine learning operation device and other processing devices. The storage device is configured to store data of the machine learning operation device and other processing devices, and particularly suitable for storing data that is to be calculated and cannot be completely saved in internal storage of the machine learning operation device or other processing devices.

The combined processing device can serve as a system on a chip (SOC) of a device, where the device can be a mobile phone, a robot, a drone, a video monitoring device, or the like. It is possible to effectively reduce core area of a control part, increase processing speed, and reduce overall power consumption. In this case, the universal interconnect interface of the combined processing device is coupled to certain components of the device, and the certain components include, but are not limited to, cameras, displays, mouse, keyboards, network cards, and wifi interfaces.

In some implementations, the present disclosure provides a chip. The chip includes the machine learning operation device or the combined processing device.

In some implementations, the present disclosure provides a chip packaging structure. The chip packaging structure includes the chip mentioned above.

In some implementations, the present disclosure provides a board. The board includes the chip packaging structure mentioned above.

In some implementations, the present disclosure provides an electronic equipment. The electronic equipment includes the board mentioned above.

The electronic equipment can be a data processing device, a robot, a computer, a printer, a scanner, a tablet, a smart terminal, a mobile phone, a driving recorder, a navigator, a sensor, a webcam, a server, a cloud server, a camera, a video camera, a projector, a watch, headphones, mobile storage, a wearable device, a vehicle, a home appliance, and/or a medical equipment.

The vehicle includes, but is not limited to, an airplane, a ship, and/or a car. The home appliance includes, but is not limited to, a TV, an air conditioner, a microwave oven, a refrigerator, an electric cooker, a humidifier, a washing machine, an electric lamp, a gas stove, and a hood. The medical equipment includes, but is not limited to, a nuclear magnetic resonance spectrometer, a B-ultrasonic and/or an electrocardiograph.

It is to be noted that, for the sake of simplicity, the foregoing method embodiments are described as a series of action combinations, however, it will be appreciated by those skilled in the art that the present disclosure is not limited by the sequence of actions described. That is because that, according to the present disclosure, certain steps or operations may be performed in other order or simultaneously. Besides, it will be appreciated by those skilled in the art that the embodiments described in the specification are exemplary embodiments and the actions and modules involved are not necessarily essential to the present disclosure.

In the foregoing embodiments, the description of each embodiment has its own emphasis. For the parts not described in detail in one embodiment, reference may be made to related descriptions in other embodiments.

In the embodiments of the disclosure, it should be understood that, the apparatus disclosed in embodiments provided herein may be implemented in other manners. For example, the device/apparatus embodiments described above are merely illustrative; for instance, the division of the unit is only a logical function division and there can be other manners of division during actual implementations, for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the embodiments.

In addition, the functional units in various embodiments of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various embodiments of the present disclosure. The memory includes various medium capable of storing program codes, such as a universal serial bus (USB), a read-only memory (ROM), a random access memory (RAM), a removable hard disk, Disk, compact disc (CD), or the like.

It will be understood by those of ordinary skill in the art that all or a part of the various methods of the embodiments described above may be accomplished by means of a program to instruct associated hardware, the program may be stored in a computer-readable memory, which may include a flash memory, a read-only memory (ROM), a random access memory (RAM), Disk or compact disc (CD), and so on.

While the present disclosure has been described in detail above with reference to the exemplary embodiments, the scope of the present disclosure is not limited thereto. As will occur to those skilled in the art, the present disclosure is susceptible to various modifications and changes without departing from the spirit and principle of the present disclosure. Therefore, the scope of the present disclosure should be determined by the scope of the claims.

What is claimed is:

1. A computing device, configured to perform machine learning calculations, comprising:
   a data I/O unit configured to acquire data and a calculation instruction, wherein a storage unit is configured to store the data and the calculation instruction; and
   a controller unit configured to extract the calculation instruction from the storage unit, to obtain an operation code and at least one operation field by parsing the calculation instruction, to extract data corresponding to the at least one operation field, and to send the operation code and the extracted data corresponding to the at least one operation field to an operation unit, wherein the extracted data corresponding to the at least one operation field is formatted as an immediate value or a register number that identifies a register,
   wherein the operation unit is configured to obtain a result of the calculation instruction by performing an operation corresponding to the operation code on the extracted data corresponding to the at least one operation field.

2. The computing device of claim 1, further comprising a storage unit that includes the data I/O unit and one or any combination of a register and a cache.

3. The computing device of claim 1, wherein the data I/O unit is further configured to acquire a machine learning model and the storage unit is configured to store the machine learning model.

4. The computing device of claim 1, wherein the at least one operation field of the calculation instruction includes a specified size of vector data.

5. The device of claim 1, wherein the acquired data includes input data, weight data, and output data.

6. The device of claim 5, wherein the operation unit comprises:
a plurality of operation modules, configured to form a structure of n-stage pipeline and to perform calculations of the n-stage pipeline; and
the operation unit is configured to:
obtain a first result by performing a calculation of a first stage pipeline on the input data and the weight data;
obtain a second result by performing a calculation of a second stage pipeline on the first result input in the second stage pipeline;
obtain a $n^{th}$ result by performing a calculation of a $n^{th}$ stage pipeline on a $(n-1)^{th}$ result input in the $n^{th}$ stage pipeline; and
input the $n^{th}$ result to the storage unit; wherein n is an integer greater than or equal to 2.

7. The device of claim 6, wherein the controller unit is configured to:
obtain a first operation code and a first operation field of the calculation instruction by parsing the calculation instruction;
extract input data and weight data corresponding to the first operation field; and
send the first operation code as well as the input data and the weight data corresponding to the first operation field to the operation unit;
wherein an operation module in a structure of a first stage pipeline of the operation unit is configured to obtain an intermediate result by performing an operation corresponding to the first operation code on the input data and the weight data; and
wherein an operation module in a structure of a second stage pipeline of the operation unit is configured to obtain the result of the first calculation instruction by performing a subsequent operation on the intermediate result.

8. The device of claim 6, wherein the controller unit is configured to:
extract a multiplication instruction from the storage unit;
obtain a first operation code and a first operation field of the multiplication instruction by parsing the multiplication instruction;
extract input data and weight data corresponding to the first operation field; and
send the first operation code as well as the input data and the weight data corresponding to the first operation field to the operation unit;
wherein an operation module in a structure of a first stage pipeline of the operation unit is configured to obtain a multiplication result by performing a multiplication operation on the input data and the weight data received;
wherein an operation module in a structure of a second stage pipeline of the operation unit is configured to:
obtain an intermediate result by performing an addition operation on the multiplication result sent to the operation module in the structure of the second stage pipeline; and
send the intermediate result to an operation module in a structure of a third stage pipeline; and
wherein the operation module in the structure of the third stage pipeline is configured to obtain a result of the multiplication instruction by stitching and combining the intermediate result.

9. The device of claim 6, wherein the controller unit is configured to:
extract a division instruction from the storage unit;
obtain a first operation code and a first operation field of the division instruction by parsing the division instruction;
extract input data and weight data corresponding to the first operation field; and
send the first operation code as well as the input data and the weight data corresponding to the first operation field to the operation unit;
wherein an operation module in a structure of a first stage pipeline is configured to:
obtain inverse weight data by performing an inversion on the weight data; and
send the input data and the inverse weight data to an operation module in a structure of a second stage pipeline;
wherein the operation module in the structure of the second stage pipeline is configured to:
obtain an intermediate result by performing an inner product operation on the input data and the inverse weight data; and
send the intermediate result to an operation module in a structure of a third stage pipeline; and
wherein the operation module in the structure of the third stage pipeline is configured to obtain a result of the division instruction by stitching and combining the intermediate result.

10. The computing device of claim 1, wherein the calculation instruction is at least one of a vector addition (VA) instruction, a vector-add-scalar (VAS) instruction, a vector subtraction (VS) instruction, a scalar-subtract-vector (SSV) instruction, a vector-multiply-vector (VMV) instruction, a vector-multiply-scalar instruction (VMS) instruction, a vector division (VD) instruction, a scalar-divide-vector (SDV) instruction, a vector AND vector (VAV) instruction, a vector AND (VAND) instruction, a vector OR vector (VOV) instruction, a vector OR (VOR) instruction, a vector exponent (VE) instruction, a vector logarithm (VL) instruction, a vector greater than (VGT) instruction, a vector equal decision (VEQ) instruction, a vector invert (VINV) instruction, a vector merge (VMER) instruction, a vector maximum (VMAX) instruction, a scalar to vector (STV) instruction, a vector Pos N (STVPN) instruction, a vector Pos N to scalar (VPNTS) instruction, a vector retrieval (VR) instruction, a vector dot product (VP) instruction, a random vector (RV) instruction, a vector cyclic shift (VCS) instruction, a vector load (VLOAD) instruction, a vector storage (VS) instruction, a vector movement (VMOVE) instruction, a matrix-multiply-vector (MMV) instruction, a vector-multiply-matrix (VMM) instruction, a matrix-multiply-scalar (VMS) instruction, a tensor operation (TENS) instruction, a matrix addition (MA) instruction, a matrix subtraction (MS) instruction, a matrix retrieval (MR) instruction, a matrix load (ML) instruction, a matrix storage (MS) instruction, or a matrix movement (MMOVE) instruction.

11. The device of claim 1, wherein the controller unit comprises:
an instruction cache unit configured to cache the first calculation instruction;
an instruction processing unit configured to obtain the operation code and the operation field of the first calculation instruction by parsing the first calculation instruction; and
a storage queue unit configured to store an instruction queue, wherein the instruction queue includes one or more calculation instructions or operation codes to be executed arranged in a sequence of the instruction queue.

12. The device of claim 11, wherein the controller unit further comprises
a dependency relationship processing unit configured to:
determine whether there is an associated relationship between the first calculation instruction and a zeroth calculation instruction stored prior to the first calculation instruction;
cache the first calculation instruction to the instruction cache unit, based on a determination that there is the associated relationship between the first calculation instruction and the zeroth calculation instruction; and
transmit the first calculation instruction extracted from the instruction cache unit to the operation unit after execution of the zeroth calculation instruction is completed;
the dependency relationship processing unit configured to determine whether there is the associated relationship between the first calculation instruction and the zeroth calculation instruction prior to the first calculation instruction is configured to:
extract a first storage address space of the operation field of the first calculation instruction, according to the first calculation instruction;
extract a zeroth storage address space of an operation field of the zeroth calculation instruction, according to the zeroth calculation instruction; and
determine there is the associated relationship between the first calculation instruction and the zeroth calculation instruction when there is an overlapping area of the first storage address space and the zeroth storage address space; or
determine there is no associated relationship between the first calculation instruction and the zeroth calculation instruction when there is no overlapping area of the first storage address space and the zeroth storage address space.

13. The computing device of claim 10,
wherein the VA instruction includes a first address and a first size for retrieving a first block of vector data and a second address and a second size for retrieving a second block of vector data, and
wherein the VA instruction instructs the operation unit to add the first block of vector data to the second block of vector data.

14. The computing device of claim 10,
wherein the VAS instruction includes a third address and a third size for retrieving a third block of vector data and a fourth address and a first value for retrieving a first scalar data, and
wherein the VAS instruction instructs the operation unit to add the first value of the first scalar data to the third block of vector data.

15. The computing device of claim 10,
wherein the VS instruction includes a fifth address and a fifth size for retrieving a fifth block of vector data and a sixth address and a sixth size for retrieving a sixth block of vector data, and
wherein the VS instruction instructs the operation unit to subtract the fifth block of vector data to the sixth block of vector data.

16. The computing device of claim 10,
wherein the SSV instruction includes a seventh address and a seventh size for retrieving a seventh block of vector data and an eighth address and a second value for retrieving a second scalar data, and
wherein the SSV instruction instructs the operation unit to subtract the second value of the second scalar data from the seventh block of vector data.

17. The computing device of claim 10,
wherein the VMV instruction includes a ninth address and a ninth size for retrieving a ninth block of vector data and a tenth address and a tenth size for retrieving a tenth block of vector data, and
wherein the VMV instruction instructs the operation unit to contrapuntally multiply the ninth block of vector data to the tenth block of vector data.

18. The computing device of claim 10,
wherein the VMS instruction includes an eleventh address and an eleventh size for retrieving a eleventh block of vector data and a twelfth address and a third value for retrieving a third scalar data, and
wherein the VMS instruction instructs the operation unit to multiply the eleventh block of vector data with the third value of the third scalar data.

19. The computing device of claim 10,
wherein the VD instruction includes a thirteenth address and a thirteenth size for retrieving a thirteenth block of vector data and a fourteenth address and a fourteenth size for retrieving a fourteenth block of vector data, and
wherein the VD instruction instructs the operation unit to contrapuntally divide the thirteenth block of vector data by the fourteenth block of vector data.

20. The computing device of claim 10,
wherein the SDV instruction includes a fifteenth address and a fifteenth size for retrieving a fifteenth block of vector data and a sixteenth address and a fourth value for retrieving a fourth scalar data, and
wherein the SDV instruction instructs the operation unit to divide the fourth value of the fourth scalar data by the corresponding elements of the fifteenth block of vector data.

21. The computing device of claim 10,
wherein the VAV instruction includes a seventeenth address and a seventeenth size for retrieving a seventeenth block of vector data and an eighteenth address and an eighteenth size for retrieving an eighteenth block of vector data, and
wherein the VAV instruction instructs the operation unit to perform a contrapuntal AND operation on the seventeenth block of vector data and the eighteenth block of vector data.

22. The computing device of claim 10,
wherein the VAND instruction includes a nineteenth address and a nineteenth size for retrieving a nineteenth block of vector data, and
wherein the VAND instruction instructs the operation unit to perform an AND operation on each element of the nineteenth block of vector data.

23. The computing device of claim 10,
wherein the VOV instruction includes a twentieth address and a twentieth size for retrieving a twentieth block of vector data and a twenty-first address and a twenty-first size for retrieving a twenty-first block of vector data, and
wherein the VOV instruction instructs the operation unit to perform a contrapuntal OR operation on the twentieth block of vector data and the twenty-first block of vector data.

24. The computing device of claim 10,
wherein the VOR instruction includes a twenty-second address and a twenty-second size for retrieving a twenty-second block of vector data, and
wherein the VOR instruction instructs the operation unit to perform an OR operation on each element of the twenty-second block of vector data.

25. The computing device of claim 10,
wherein the VE instruction includes a twenty-third address and a twenty-third size for retrieving a twenty-third block of vector data, and
wherein the VE instruction instructs the operation unit to perform an exponent operation on each element of the twenty-third block of vector data.

26. The computing device of claim 10,
wherein the VL instruction includes a twenty-fourth address and a twenty-fourth size for retrieving a twenty-fourth block of vector data, and
wherein the VL instruction instructs the operation unit to perform a logarithm operation on each element of the twenty-fourth block of vector data.

27. The computing device of claim 10,
wherein the VGT instruction includes a twenty-fifth address and a twenty-fifth size for retrieving a twenty-fifth block of vector data and a twenty-sixth address and a twenty-sixth size for retrieving a twenty-sixth block of vector data, and
wherein the VGT instruction instructs the operation unit to contrapuntally compare the twenty-fifth block of vector data and the twenty-sixth block of vector data, and a corresponding element of an output vector is set as "1" if an element of the twenty-fifth block of vector data is greater than a corresponding element of the twenty-sixth block of vector, otherwise, the corresponding element of the output vector data is set as "0".

28. The computing device of claim 10,
wherein the VEQ instruction includes a twenty-seventh address and a twenty-seventh size for retrieving a twenty-seventh block of vector data and a twenty-eighth address and a twenty-eighth size for retrieving a twenty-eighth block of vector data, and
wherein the VEQ instruction instructs the operation unit to contrapuntally compare the twenty-seventh block of vector data and the twenty-eighth block of vector data, and a corresponding element of an output vector is set as "1" if an element of the twenty-seventh block of vector is equal to a corresponding element of the twenty-eighth block of vector, otherwise, the corresponding element of the output vector is set as "0".

29. The computing device of claim 10,
wherein the VINV instruction includes a twenty-ninth address and a twenty-ninth size for retrieving a twenty-ninth block of vector data, and
wherein the VINV instruction instructs the operation unit to perform a NOT operation on each element of the twenty-ninth block of vector data.

30. The computing device of claim 10,
wherein the VMER instruction includes a thirtieth address and a thirtieth size for retrieving a thirtieth block of a selecting vector data, a thirty-first address and a thirty-first size for retrieving a thirty-first block of a selected vector I data and a thirty-second address and a thirty-second size for retrieving a thirty-second block of a selected vector II data, and
wherein the VMER instruction instructs the operation unit to select a corresponding element from thirty-first block of the selected vector I data or the thirty-second block of a selected vector II data as an element of an output vector, according to a value ("1" or "0") of an element of the thirtieth block of a selecting vector data.

31. The computing device of claim 10,
wherein the VMAX instruction includes a thirty-third address and a thirty-third size for retrieving a thirty-third block of a vector data, and
wherein the VMAX instruction instructs the operation unit to select a maximum element of the thirty-third block of a vector data.

32. The computing device of claim 10,
wherein the STV instruction includes a thirty-fourth address and a fifth value for retrieving a fifth scalar data, and
wherein the STV instruction instructs the operation unit to extend the fifth scalar data to be a vector of a specified size.

33. The computing device of claim 10,
wherein the STVPN instruction includes a thirty-fifth address and a sixth value for retrieving a sixth scalar data and a thirty-sixth address and a thirty-sixth size for retrieving a thirty-sixth block of a vector data, and
wherein the STVPN instruction instructs the operation unit to replace an element in a first specified position of the thirty-sixth block of the vector data with the sixth value of the sixth scalar.

34. The computing device of claim 10,
wherein the VPNTS instruction includes a thirty-seventh address and a seventh value for retrieving a seventh scalar data and a thirty-eighth address and a thirty-eighth size for retrieving a thirty-eighth block of a vector data, and
wherein the VPNTS instruction instructs the operation unit to replace the seventh value of the seventh scalar with an element in a second specified position of the thirty-eighth block of the vector data.

35. The computing device of claim 10,
wherein the VR instruction includes a thirty-ninth address and a thirty-ninth size for retrieving a thirty-ninth block of vector data, and
wherein the VR instruction instructs the operation unit to extract an element of the thirty-ninth block of vector data according to a third specified position as an output.

36. The computing device of claim 10,
wherein the VP instruction includes a fortieth address and a fortieth size for retrieving a fortieth block of vector data and a forty-first address and a forty-first size for retrieving a forty-first block of vector data, and
wherein the VP instruction instructs the operation unit to perform a dot product operation on each element of the fortieth block of vector data and the forty-first block of vector data.

37. The computing device of claim 10,
wherein the RV instruction instructs the operation unit to generates a random vector satisfying uniform distribution ranging from 0 to 1.

38. The computing device of claim 10,
wherein the VCS instruction includes a forty-second address and a forty-second size for retrieving a forty-second block of vector data, and
wherein the VCS instruction instructs the operation unit to perform a cyclic shift operation on the forty-second block of vector data according to a specified size.

39. The computing device of claim 10,
wherein the VLOAD instruction includes a forty-third address and a forty-third size for loading a forty-third vector data from a first specified external source address.

40. The computing device of claim 10,
wherein the VS instruction includes a forty-fourth address and a forty-fourth size for storing a forty-fourth vector data into a second specified external destination address.

41. The computing device of claim 10,
wherein the VMOVE instruction includes a forty-fifth address and a forty-fifth size for storing a forty-fifth vector data into another specified address.

42. The computing device of claim 10,
wherein the MMV instruction includes a forty-sixth address and a forty-sixth size for retrieving a forty-sixth block of matrix data and a forty-seventh address and a forty-seventh size for retrieving a forty-seventh block of vector data, and
wherein the MMV instruction instructs the operation unit to multiply the forty-sixth block of matrix data with the forty-seventh block of vector data.

43. The computing device of claim 10,
wherein the VMM instruction includes a forty-eighth address and a forty-eighth size for retrieving a forty-eighth block of vector data and a forty-ninth address and a forty-ninth size for retrieving a forty-ninth block of matrix data, and
wherein the VMM instruction instructs the operation unit to multiply the forty-eighth block of vector data by the forty-ninth block of matrix data.

44. The computing device of claim 10,
wherein the VMS instruction includes a fiftieth address and a fiftieth size for retrieving a fiftieth block of matrix data and a fifty-first address and an eighth value for retrieving an eighth scalar data, and
wherein the VMS instruction instructs the operation unit to multiply the eighth scalar data by the fiftieth block of matrix data.

45. The computing device of claim 10,
wherein the TENS instruction includes a fifty-second address and a fifty-second size for retrieving a fifty-second block of matrix data and a fifty-third address and a fifty-third size for retrieving a fifty-third block of matrix data, and
wherein the TENS instruction instructs the operation unit to perform a tensor operation on the fifty-second block of matrix data and the fifty-third block of matrix data.

46. The computing device of claim 10,
wherein the MA instruction includes a fifty-fourth address and a fifty-fourth size for retrieving a fifty-fourth block of matrix data and a fifty-fifth address and a fifty-fifth size for retrieving a fifty-fifth block of matrix data, and
wherein the MA instruction instructs the operation unit to perform an addition operation on the fifty-fourth block of matrix data and the fifty-fifth block of matrix data.

47. The computing device of claim 10,
wherein the MS instruction includes a fifty-sixth address and a fifty-sixth size for retrieving a fifty-sixth block of matrix data and a fifty-seventh address and a fifty-seventh size for retrieving a fifty-seventh block of matrix data, and
wherein the MS instruction instructs the operation unit to perform a subtraction operation on the fifty-sixth block of matrix data and the fifty-seventh block of matrix data.

48. The computing device of claim 10,
wherein the MR instruction includes a fifty-eighth address and a fifty-eighth size for retrieving a fifty-eighth block of vector data and a fifty-ninth address and a fifty-ninth size for retrieving a fifty-ninth block of matrix data, and
wherein the MR instruction instructs the fifty-eighth block of vector data to be an index vector, and an ith element of an output vector to be an element found in the ith column of the fifty-ninth block of matrix data by using an ith element of the index vector as an index.

49. The computing device of claim 10,
wherein the ML instruction includes a sixtieth address and a sixtieth size for loading a sixtieth block of matrix data from a third specified external source address.

50. The computing device of claim 10,
wherein the MS instruction includes a sixty-first address and a sixty-first size for storing a sixty-first block of matrix data into a fourth specified external destination address.

51. The computing device of claim 10,
wherein the MMOVE instruction includes a sixty-second address and a sixty-second size for storing a sixty-second block of matrix data into a sixty-third address.

52. A computing method to perform machine learning calculations, comprising:
acquiring, by a data I/O unit, data and a calculation instruction, wherein a storage unit is configured to store the data and the calculation instruction; and
extracting, by a controller unit, the calculation instruction from the storage unit, to obtain an operation code and at least one operation field by parsing the calculation instruction, to extract data corresponding to the at least one operation field, and to send the operation code and the extracted data corresponding to the at least one operation field to an operation unit, wherein the extracted data corresponding to the at least one operation field is formatted as an immediate value or a register number that identifies a register,
wherein the operation unit is configured to obtain a result of the calculation instruction by performing an operation corresponding to the operation code on the extracted data corresponding to the at least one operation field.

53. The computing method of claim 52, further comprising acquiring, by the data I/O unit, a machine learning model, and storing, by the storage unit, the machine learning model.

54. The computing method of claim 52, wherein the at least one operation field of the calculation instruction includes a specified size of vector data.

55. The method of claim 52, wherein the acquired data comprises input data, weight data, and output data.

56. The method of claim 55, further comprising
forming, a plurality of operation modules of the operation unit, a structure of n-stage pipeline and to perform calculations of the n-stage pipeline; and
obtaining, by the operation unit, a first result by performing a calculation of a first stage pipeline on the input data and the weight data;
obtaining, by the operation unit, a second result by performing a calculation of a second stage pipeline on the first result input in the second stage pipeline;
obtaining, by the operation unit, a $n^{th}$ result by performing a calculation of a $n^{th}$ stage pipeline on a $(n-1)^{th}$ result input in the $n^{th}$ stage pipeline; and
inputting, by the operation unit, the $n^{th}$ result to the storage unit; wherein n is an integer greater than or equal to 2.

57. The method of claim 56, further comprising:
obtaining, by the controller unit, a first operation code and a first operation field of the calculation instruction by parsing the calculation instruction;
extracting, by the controller unit, input data and weight data corresponding to the first operation field;
sending, by the controller unit, the first operation code as well as the input data and the weight data corresponding to the first operation field to the operation unit;

obtaining, by an operation module in a structure of a first stage pipeline of the operation unit, an intermediate result by performing an operation corresponding to the first operation code on the input data and the weight data; and obtaining, by an operation module in a structure of a second stage pipeline of the operation unit, the result of the first calculation instruction by performing a subsequent operation on the intermediate result.

58. The method of claim 56, further comprising:
extracting, by the controller unit, a multiplication instruction from the storage unit;
obtaining, by the controller unit, a first operation code and a first operation field of the multiplication instruction by parsing the multiplication instruction;
extracting, by the controller unit, input data and weight data corresponding to the first operation field;
sending, by the controller unit, the first operation code as well as the input data and the weight data corresponding to the first operation field to the operation unit;
obtaining, by an operation module in a structure of a first stage pipeline of the operation unit, a multiplication result by performing a multiplication operation on the input data and the weight data received;
obtaining, by an operation module in a structure of a second stage pipeline of the operation unit, an intermediate result by performing an addition operation on the multiplication result sent to the operation module in the structure of the second stage pipeline;
sending, by the operation module in the structure of the second stage pipeline of the operation unit, the intermediate result to an operation module in a structure of a third stage pipeline; and
obtaining, by the operation module in the structure of the third stage pipeline, a result of the multiplication instruction by stitching and combining the intermediate result.

59. The method of claim 56, further comprising:
extracting, by the controller unit, a division instruction from the storage unit;
obtaining, by the controller unit, a first operation code and a first operation field of the division instruction by parsing the division instruction;
extracting, by the controller unit, input data and weight data corresponding to the first operation field;
sending, by the controller unit, the first operation code as well as the input data and the weight data corresponding to the first operation field to the operation unit;
obtaining, by an operation module in a structure of a first stage pipeline, inverse weight data by performing an inversion on the weight data;
sending, by the operation module in the structure of the first stage pipeline, the input data and the inverse weight data to an operation module in a structure of a second stage pipeline;
obtaining, by the operation module in the structure of the second stage pipeline, an intermediate result by performing an inner product operation on the input data and the inverse weight data;
sending, by the operation module in the structure of the second stage pipeline, the intermediate result to an operation module in a structure of a third stage pipeline; and
obtaining, by the operation module in the structure of the third stage pipeline, a result of the division instruction by stitching and combining the intermediate result.

60. The method of claim 52, further comprising:
caching, by an instruction cache unit of the controller unit, the first calculation instruction;
obtaining, by an instruction processing unit of the controller unit, the operation code and the operation field of the first calculation instruction by parsing the first calculation instruction; and
storing, by a storage queue unit of the controller unit, an instruction queue, wherein the instruction queue comprises a plurality of calculation instructions or operation codes to be executed arranged in a sequence of the instruction queue.

61. The method of claim 52, further comprising:
determining, by a dependency relationship processing unit of the controller unit, whether there is an associated relationship between the first calculation instruction and a zeroth calculation instruction prior to the first calculation instruction;
caching, by the dependency relationship processing unit of the controller unit, the first calculation instruction to the instruction cache unit, based on a determination that there is the associated relationship between the first calculation instruction and the zeroth calculation instruction; and
transmitting, by the dependency relationship processing unit of the controller unit, the first calculation instruction extracted from the instruction cache unit to the operation unit after execution of the zeroth calculation instruction is completed,
wherein determining, by the dependency relationship processing unit of the controller unit, whether there is the associated relationship between the first calculation instruction and the zeroth calculation instruction prior to the first calculation instruction further comprises:
extracting a first storage address space of the operation field of the first calculation instruction, according to the first calculation instruction;
extracting a zeroth storage address space of an operation field of the zeroth calculation instruction, according to the zeroth calculation instruction; and
determining there is the associated relationship between the first calculation instruction and the zeroth calculation instruction when there is an overlapping area of the first storage address space and the zeroth storage address space; or
determining there is no associated relationship between the first calculation instruction and the zeroth calculation instruction when there is no overlapping area of the first storage address space and the zeroth storage address space.

62. The computing method of claim 52, wherein the calculation instruction is at least one of a vector addition (VA) instruction, a vector-add-scalar (VAS) instruction, a vector subtraction (VS) instruction, a scalar-subtract-vector (SSV) instruction, a vector-multiply-vector (VMV) instruction, a vector-multiply-scalar instruction (VMS) instruction, a vector division (VD) instruction, a scalar-divide-vector (SDV) instruction, a vector AND vector (VAV) instruction, a vector AND (VAND) instruction, a vector OR vector (VOV) instruction, a vector OR (VOR) instruction, a vector exponent (VE) instruction, a vector logarithm (VL) instruction, a vector greater than (VGT) instruction, a vector equal decision (VEQ) instruction, a vector invert (VINV) instruction, a vector merge (VMER) instruction, a vector maximum (VMAX) instruction, a scalar to vector (STV) instruction, a vector Pos N (STVPN) instruction, a vector Pos N to scalar (VPNTS) instruction, a vector retrieval (VR) instruction, a vector dot product (VP) instruction, a random vector (RV)

instruction, a vector cyclic shift (VCS) instruction, a vector load (VLOAD) instruction, a vector storage (VS) instruction, a vector movement (VMOVE) instruction, a matrix-multiply-vector (MMV) instruction, a vector-multiply-matrix (VMM) instruction, a matrix-multiply-scalar (VMS) instruction, a tensor operation (TENS) instruction, a matrix addition (MA) instruction, a matrix subtraction (MS) instruction, a matrix retrieval (MR) instruction, a matrix load (ML) instruction, a matrix storage (MS) instruction, or a matrix movement (MMOVE) instruction.

63. The computing method of claim 62,
wherein the VA instruction includes a first address and a first size for retrieving a first block of vector data and a second address and a second size for retrieving a second block of vector data, and
wherein the VA instruction instructs the operation unit to add the first block of vector data to the second block of vector data.

64. The computing method of claim 62,
wherein the VAS includes a third address and a third size for retrieving a third block of vector data and a fourth address and a first value for retrieving a first scalar data, and
wherein the VAS instruction instructs the operation unit to add the first value of the first scalar data to the third block of vector data.

65. The computing method of claim 62,
wherein the VS instruction includes a fifth address and a fifth size for retrieving a fifth block of vector data and a sixth address and a sixth size for retrieving a sixth block of vector data, and
wherein the VS instruction instructs the operation unit to subtract the fifth block of vector data to the sixth block of vector data.

66. The computing method of claim 62,
wherein the SSV instruction includes a seventh address and a seventh size for retrieving a seventh block of vector data and an eighth address and a second value for retrieving a second scalar data, and
wherein the SSV instruction instructs the operation unit to subtract the second value of the second scalar data from the seventh block of vector data.

67. The computing method of claim 62,
wherein the VMV instruction includes a ninth address and a ninth size for retrieving a ninth block of vector data and a tenth address and a tenth size for retrieving a tenth block of vector data, and
wherein the VMV instruction instructs the operation unit to contrapuntally multiply the ninth block of vector data to the tenth block of vector data.

68. The computing method of claim 62,
wherein the VMS instruction includes an eleventh address and an eleventh size for retrieving a eleventh block of vector data and a twelfth address and a third value for retrieving a third scalar data, and
wherein the VMS instruction instructs the operation unit to multiply the eleventh block of vector data with the third value of the third scalar data.

69. The computing method of claim 62,
wherein the VD instruction includes a thirteenth address and a thirteenth size for retrieving a thirteenth block of vector data and a fourteenth address and a fourteenth size for retrieving a fourteenth block of vector data, and
wherein the VD instruction instructs the operation unit to contrapuntally divide the thirteenth block of vector data by the fourteenth block of vector data.

70. The computing method of claim 62,
wherein the SDV instruction includes a fifteenth address and a fifteenth size for retrieving a fifteenth block of vector data and a sixteenth address and a fourth value for retrieving a fourth scalar data, and
wherein the SDV instruction instructs the operation unit to divide the fourth value of the fourth scalar data by the corresponding elements of the fifteenth block of vector data.

71. The computing method of claim 62,
wherein the VAV instruction includes a seventeenth address and a seventeenth size for retrieving a seventeenth block of vector data and an eighteenth address and an eighteenth size for retrieving an eighteenth block of vector data, and
wherein the VAV instruction instructs the operation unit to perform a contrapuntal AND operation on the seventeenth block of vector data and the eighteenth block of vector data.

72. The computing method of claim 62,
wherein the VAND instruction includes a nineteenth address and a nineteenth size for retrieving a nineteenth block of vector data, and
wherein the VAND instruction instructs the operation unit to perform an AND operation on each element of the nineteenth block of vector data.

73. The computing method of claim 62,
wherein the VOV instruction includes a twentieth address and a twentieth size for retrieving a twentieth block of vector data and a twenty-first address and a twenty-first size for retrieving a twenty-first block of vector data, and
wherein the VOV instruction instructs the operation unit to perform a contrapuntal OR operation on the twentieth block of vector data and the twenty-first block of vector data.

74. The computing method of claim 62,
wherein the VOR instruction includes a twenty-second address and a twenty-second size for retrieving a twenty-second block of vector data, and
wherein the VOR instruction instructs the operation unit to perform an OR operation on each element of the twenty-second block of vector data.

75. The computing method of claim 62,
wherein the VE instruction includes a twenty-third address and a twenty-third size for retrieving a twenty-third block of vector data, and
wherein the VE instruction instructs the operation unit to perform an exponent operation on each element of the twenty-third block of vector data.

76. The computing method of claim 62,
wherein the VL instruction includes a twenty-fourth address and a twenty-fourth size for retrieving a twenty-fourth block of vector data, and
wherein the VL instruction instructs the operation unit to perform a logarithm operation on each element of the twenty-fourth block of vector data.

77. The computing method of claim 62,
wherein the VGT instruction includes a twenty-fifth address and a twenty-fifth size for retrieving a twenty-fifth block of vector data and a twenty-sixth address and a twenty-sixth size for retrieving a twenty-sixth block of vector data, and
wherein the VGT instruction instructs the operation unit to contrapuntally compare the twenty-fifth block of vector data and the twenty-sixth block of vector data, and a corresponding element of an output vector is set as "1" if an element of the twenty-fifth block of vector data is greater than a corresponding element of the twenty-sixth block of vector, otherwise, the corresponding element of the output vector data is set as "0".

78. The computing method of claim 62,
wherein the VEQ instruction includes a twenty-seventh address and a twenty-seventh size for retrieving a twenty-seventh block of vector data and a twenty-eighth address and a twenty-eighth size for retrieving a twenty-eighth block of vector data, and
wherein the VEQ instruction instructs the operation unit to contrapuntally compare the twenty-seventh block of vector data and the twenty-eighth block of vector data, and a corresponding element of an output vector is set as "1" if an element of the twenty-seventh block of vector is equal to a corresponding element of the twenty-eighth block of vector, otherwise, the corresponding element of the output vector is set as "0".

79. The computing method of claim 62,
wherein the VINV instruction includes a twenty-ninth address and a twenty-ninth size for retrieving a twenty-ninth block of vector data, and
wherein the VINV instruction instructs the operation unit to perform a NOT operation on each element of the twenty-ninth block of vector data.

80. The computing method of claim 62,
wherein the VMER instruction includes a thirtieth address and a thirtieth size for retrieving a thirtieth block of a selecting vector data, a thirty-first address and a thirty-first size for retrieving a thirty-first block of a selected vector I data and a thirty-second address and a thirty-second size for retrieving a thirty-second block of a selected vector II data, and
wherein the VMER instruction instructs the operation unit to select a corresponding element from thirty-first block of the selected vector I data or the thirty-second block of a selected vector II data as an element of an output vector, according to a value ("1" or "0") of an element of the thirtieth block of a selecting vector data.

81. The computing method of claim 62,
wherein the VMAX instruction includes a thirty-third address and a thirty-third size for retrieving a thirty-third block of a vector data, and
wherein the VMAX instruction instructs the operation unit to select a maximum element of the thirty-third block of a vector data.

82. The computing method of claim 62,
wherein the STV instruction includes a thirty-fourth address and a fifth value for retrieving a fifth scalar data, and
wherein the STV instruction instructs the operation unit to extend the fifth scalar data to be a vector of a specified size.

83. The computing method of claim 62,
wherein the STVPN instruction includes a thirty-fifth address and a sixth value for retrieving a sixth scalar data and a thirty-sixth address and a thirty-sixth size for retrieving a thirty-sixth block of a vector data, and
wherein the STVPN instruction instructs the operation unit to replace an element in a first specified position of the thirty-sixth block of the vector data with the sixth value of the sixth scalar.

84. The computing method of claim 62,
wherein the VPNTS instruction includes a thirty-seventh address and a seventh value for retrieving a seventh scalar data and a thirty-eighth address and a thirty-eighth size for retrieving a thirty-eighth block of a vector data, and
wherein the VPNTS instruction instructs the operation unit to replace the seventh value of the seventh scalar with an element in a second specified position of the thirty-eighth block of the vector data.

85. The computing method of claim 62,
wherein the VR instruction includes a thirty-ninth address and a thirty-ninth size for retrieving a thirty-ninth block of vector data, and
wherein the VR instruction instructs the operation unit to extract an element of the thirty-ninth block of vector data according to a third specified position as an output.

86. The computing method of claim 62,
wherein the VP instruction includes a fortieth address and a fortieth size for retrieving a fortieth block of vector data and a forty-first address and a forty-first size for retrieving a forty-first block of vector data, and
wherein the VP instruction instructs the operation unit to perform a dot product operation on each element of the fortieth block of vector data and the forty-first block of vector data.

87. The computing method of claim 62,
wherein the RV instruction instructs the operation unit to generates a random vector satisfying uniform distribution ranging from 0 to 1.

88. The computing method of claim 62,
wherein the VCS instruction includes a forty-second address and a forty-second size for retrieving a forty-second block of vector data, and
wherein the VCS instruction instructs the operation unit to perform a cyclic shift operation on the forty-second block of vector data according to a specified size.

89. The computing method of claim 62,
wherein the VLOAD instruction includes a forty-third address and a forty-third size for loading a forty-third vector data from a first specified external source address.

90. The computing method of claim 62,
wherein the VS instruction includes a forty-fourth address and a forty-fourth size for storing a forty-fourth vector data into a second specified external destination address.

91. The computing method of claim 62,
wherein the VMOVE instruction includes a forty-fifth address and a forty-fifth size for storing a forty-fifth vector data into another specified address.

92. The computing method of claim 62,
wherein the MMV instruction includes a forty-sixth address and a forty-sixth size for retrieving a forty-sixth block of matrix data and a forty-seventh address and a forty-seventh size for retrieving a forty-seventh block of vector data, and
wherein the MMV instruction instructs the operation unit to multiply the forty-sixth block of matrix data with the forty-seventh block of vector data.

93. The computing method of claim 62,
wherein the VMM instruction includes a forty-eighth address and a forty-eighth size for retrieving a forty-eighth block of vector data and a forty-ninth address and a forty-ninth size for retrieving a forty-ninth block of matrix data, and
wherein the VMM instruction instructs the operation unit to multiply the forty-eighth block of vector data by the forty-ninth block of matrix data.

94. The computing method of claim 62,
wherein the VMS instruction includes a fiftieth address and a fiftieth size for retrieving a fiftieth block of matrix data and a fifty-first address and an eighth value for retrieving an eighth scalar data, and wherein the VMS instruction instructs the operation unit to multiply the eighth scalar data by the fiftieth block of matrix data.

95. The computing method of claim 62, wherein the TENS instruction includes a fifty-second address and a fifty-second size for retrieving a fifty-second block of matrix data and a fifty-third address and a fifty-third size for retrieving a fifty-third block of matrix data, and wherein the TENS instruction instructs the operation unit to perform a tensor operation on the fifty-second block of matrix data and the fifty-third block of matrix data.

96. The computing method of claim 62, wherein the MA instruction includes a fifty-fourth address and a fifty-fourth size for retrieving a fifty-fourth block of matrix data and a fifty-fifth address and a fifty-fifth size for retrieving a fifty-fifth block of matrix data, and wherein the MA instruction instructs the operation unit to perform an addition operation on the fifty-fourth block of matrix data and the fifty-fifth block of matrix data.

97. The computing method of claim 62, wherein the MS instruction includes a fifty-sixth address and a fifty-sixth size for retrieving a fifty-sixth block of matrix data and a fifty-seventh address and a fifty-seventh size for retrieving a fifty-seventh block of matrix data, and wherein the MS instruction instructs the operation unit to perform a subtraction operation on the fifty-sixth block of matrix data and the fifty-seventh block of matrix data.

98. The computing method of claim 62, wherein the MR instruction includes a fifty-eighth address and a fifty-eighth size for retrieving a fifty-eighth block of vector data and a fifty-ninth address and a fifty-ninth size for retrieving a fifty-ninth block of matrix data, and wherein the MR instruction instructs the fifty-eighth block of vector data to be an index vector, and an ith element of an output vector to be an element found in the ith column of the fifty-ninth block of matrix data by using an ith element of the index vector as an index.

99. The computing method of claim 62, wherein the ML instruction includes a sixtieth address and a sixtieth size for loading a sixtieth block of matrix data from a third specified external source address.

100. The computing method of claim 62, wherein the MS instruction includes a sixty-first address and a sixty-first size for storing a sixty-first block of matrix data into a fourth specified external destination address.

101. The computing method of claim 62, wherein the MMOVE instruction includes a sixty-second address and a sixty-second size for storing a sixty-second block of matrix data into a sixty-third address.

* * * * *